US011720346B2

(12) United States Patent
Wu et al.

(10) Patent No.: US 11,720,346 B2
(45) Date of Patent: Aug. 8, 2023

(54) SEMANTIC CODE RETRIEVAL USING GRAPH MATCHING

(71) Applicant: International Business Machines Corporation, Armonk, NY (US)

(72) Inventors: Lingfei Wu, Elmsford, NY (US); Liana Fong, Irvington, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 104 days.

(21) Appl. No.: 17/061,862

(22) Filed: Oct. 2, 2020

(65) Prior Publication Data
US 2022/0107799 A1    Apr. 7, 2022

(51) Int. Cl.
G06F 8/70        (2018.01)
G06F 16/22       (2019.01)
G06F 16/2455     (2019.01)
G06F 16/901      (2019.01)
G06F 8/75        (2018.01)
G06N 20/00       (2019.01)
G06N 3/08        (2023.01)

(52) U.S. Cl.
CPC ............ G06F 8/70 (2013.01); G06F 16/2246 (2019.01); G06F 16/24556 (2019.01); G06F 16/9024 (2019.01); G06N 20/00 (2019.01)

(58) Field of Classification Search
CPC ........... G06F 16/2246; G06F 16/24556; G06F 16/9024; G06F 8/70; G06N 20/00
See application file for complete search history.

(56) References Cited

U.S. PATENT DOCUMENTS 9,280,322 B2 * 3/2016 Reyes Lozano .......... G06F 8/77
9,298,453 B2   3/2016 Vangala et al.
(Continued)

FOREIGN PATENT DOCUMENTS

CN       1853180 A    10/2006
CN    102063488 A     5/2011
(Continued)

OTHER PUBLICATIONS

Xiaojun Xu et la. Neural Network-based Graph Embedding for Cross-Platform Binary Code Similarity Detection; arXiv:1708.06525; https://doi.org/10.48550/arXiv.1708.06525, 2017 (Year: 2017).*

(Continued)

*Primary Examiner* — Dennis Truong
(74) *Attorney, Agent, or Firm* — Amin, Turocy & Watson, LLP

(57) ABSTRACT

Techniques regarding code retrieval tasks are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a code retrieval component that can execute a code retrieval machine learning task by computing an amount of similarity between neural network embeddings of graph representations of a query text and at least a portion of a computer program code.

20 Claims, 14 Drawing Sheets

(56) References Cited

U.S. PATENT DOCUMENTS

| | | | |
|---|---|---|---|
| 9,519,464 B2* | 12/2016 | Dang | G06F 8/33 |
| 11,194,553 B2* | 12/2021 | Seshadri | G06F 8/71 |
| 11,263,277 B1* | 3/2022 | Podgorny | G06F 16/3329 |
| 2014/0013299 A1* | 1/2014 | Bordeaux | G06F 8/30 |
| | | | 717/106 |
| 2014/0013304 A1 | 1/2014 | Vangala et al. | |
| 2014/0282375 A1* | 9/2014 | Gulwani | G06F 8/36 |
| | | | 717/107 |
| 2014/0358883 A1 | 12/2014 | Johnson et al. | |
| 2018/0341702 A1* | 11/2018 | Sawruk | G06F 16/683 |
| 2019/0213284 A1* | 7/2019 | Anand | G06F 40/35 |
| 2019/0354689 A1* | 11/2019 | Li | G06N 3/04 |
| 2021/0058345 A1* | 2/2021 | Yoon | H04L 51/02 |
| 2021/0141863 A1* | 5/2021 | Wu | G06F 40/30 |
| 2021/0326393 A1* | 10/2021 | Aggarwal | G06N 3/0427 |
| 2021/0349954 A1* | 11/2021 | Renders | G06F 16/783 |

FOREIGN PATENT DOCUMENTS

| | | | |
|---|---|---|---|
| CN | 108717423 A | | 10/2018 |
| CN | 111177312 A | | 5/2020 |
| CN | 111191002 A | * | 5/2020 |
| CN | 111240687 A | | 6/2020 |
| WO | 2010089248 A1 | | 8/2020 |

OTHER PUBLICATIONS

Y. Wan et al., "Multi-modal Attention Network Learning for Semantic Source Code Retrieval," 2019 34th IEEE/ACM International Conference on Automated Software Engineering (ASE), 2019, pp. 13-25, doi: 10.1109/ASE.2019.00012. (Year: 2019).*

W. Li, H. Qin, S. Yan, B. Shen and Y. Chen, "Learning Code-Query Interaction for Enhancing Code Searches," 2020 IEEE International Conference on Software Maintenance and Evolution (ICSME), 2020, pp. 115-126, doi: 10.1109/ICSME46990.2020.00021. (Year: 2020).*

Sun et al. "PSCS: A Path-based Neural Model for Semantic Code Search" arXiv:2008.03042 [cs.SE]; Aug. 17, 2020 (Year: 2020).*

Haidar et al. "A Multi-Perspective Architecture for Semantic Code Search"; ARXIV ID: 2005.06980 ; May 6, 2020 (Year: 2020).*

S. Akbar and A. Kak, "SCOR: Source Code Retrieval with Semantics and Order," 2019 IEEE/ACM 16th International Conference on Mining Software Repositories (MSR), 2019, pp. 1-12, doi: 10.1109/MSR.2019.00012. (Year: 2019).*

Uri et al. "code2vec: Learning Distributed Representations of Code" arXiv:1803.09473; Oct. 30, 2018 (Year: 2018).*

You, Renchun, et al. "Cross-modality attention with semantic graph embedding for multi-label classification." Proceedings of the AAAI conference on artificial intelligence. vol. 34. No. 07. 2020. (Year: 2020).*

Zhang, Zufan, Yang Zou, and Chenquan Gan. "Textual sentiment analysis via three different attention convolutional neural networks and cross-modality consistent regression." Neurocomputing 275 (2018): 1407-1415. (Year: 2018).*

Allamanis et al. "A Survey of Machine Learning for Big Code and Naturalness" ACM Computing Surveys (CSUR), 51(4):1-37, 2018.

Allamanis et al. "Learning to Represent Programs with Graphs" arXiv:1711.00740v3 [cs.LG] May 4, 2018, 17 pages.

Alon et al. "CODE2SEQ: Generating Sequences From Structured Representations of Code" arXiv:1808.01400v6 [cs.LG] Feb. 21, 2019, 22 pages.

Balntas et al. "Learning local feature descriptors with triplets and shallow convolutional neural networks" BMVC 2016, 11 pages.

Bojanowski et al. "Enriching Word Vectors with Subword Information" Transactions of the Association for Computational Linguistics, 5:135-146, 2017. 13 pages.

Brockschmidt et al. "Generative Code Modeling With Graphs" arXiv:1805.08490v2 [cs.LG] Apr. 16, 2019, 24 pages.

Bromley et al. "Signature Verification using a "Siamese" Time Delay Neural Network" Advances in neural Information processing systems, pp. 737 744.

Bronstein et al. "Geometric deep learning: going beyond Euclidean data" arXiv:1611.08097v2 [cs.CV] May 3, 2017, 22 pages.

Cambronero et al. "When Deep Learning Met Code Search" arXiv:1905.03813v4 [cs.SE] Oct. 15, 2019, 11 pages.

Cho et al. "Learning Phrase Representations using RNN Encoder-Decoder for Statistical Machine Translation" arXiv:1406.1078v3 [cs CL] Sep. 3, 2014, 15 pages.

Chomsky "Three models for the description of language" IRE Transactions on information theory, 2(3):113-124.

Cvitkovic et al. "Open Vocabulary Learning on Source Code with a Graph-Structured Cache" arXiv:1810.08305v2 [cs.LG] May 19, 2019, 18 pages.

"Neural Code Search Evaluation Dataset" Facebook AI, https://ai.facebook.com/blog/neural-code-search-evaluation-dataset/, Last Accessed Aug. 19, 2020, 5 pages.

Fernandes et al. "Structured neural summarization" arXiv:1811.01824v3 [cs.LG] May 4, 2020, 18 pages.

Fey et al. "Fast graph representation learning with PyTorch Geometric" arXiv:1903.02428v3 [cs.LG] Apr. 25, 2019, 9 pages.

Gilmer et al. "Neural Message Passing for Quantum Chemistry" arXiv:1704.01212v2 [cs.LG] Jun. 12, 2017, 14 pages.

Gu et al. "Deep Code Search" 2018 IEEE/ACM 40th International Conference on Software Engineering (ICSE), pp. 933-944. IEEE.

Haldar et al. "A Multi-Perspective Architecture for Semantic Code Search" arXiv:2005.06980v1 [cs.SE] May 6, 2020, 6 pages.

Hill et al. "Improving source code search with natural language phrasal representations of method signatures" Automated Software Engineering (ASE 2011), pp. 524-527. IEEE.

Hochreiter et al. "Long Short-term Memory" Neural Computation 9(8) 1735-80 • Dec. 1997, 33 pages.

Husain et al. "CodeSearchNet Challenge: Evaluating the State of Semantic Code Search" arXiv:1909.09436v3 [cs.LG] Jun. 8, 2020, 6 pages.

Iyer et al. "Summarizing Source Code using a Neural Attention Model" Proceedings of the 54th Annual Meeting of the Association for Computational Linguistics (vol. 1: Long Papers), pp. 2073-2083.

Jurafsky et al. "Speech and Language Processing: An Introduction to Natural Language Processing, Computational Linguistics, and Speech Recognition" Oct. 16, 2019, https://web.stanford.edu/~jurafsky/slp3/., Last Accessed Aug. 19, 2020, 621 pages.

Kim "Convolutional Neural Networks for Sentence Classification" arXiv:1408.5882v2 [cs.CL] Sep. 3, 2014, 6 pages.

Li et al. "Neural Code Search Evaluation Dataset" arXiv:1908.09804v6 [cs.SE] Oct. 2, 2019, 3 pages.

Linstead et al. "Sourcerer: mining and searching internet-scale software repositories" Data Mining and Knowledge Discovery, 18(2):300-336.

Manning et al. "The Stanford CoreNLP natural language processing toolkit" Proceedings of 52nd Annual Meeting of the Association for Computational Linguistics: System Demonstrations, 2014, 6 pages.

McMillan et al. "Portfolio: finding relevant functions and their usage" Proceedings of the 33rd International Conference on Software Engineering, pp. 111-120, 2011.

Oda et al. "Learning to Generate Pseudo-code from Source Code using Statistical Machine Translation" 2015 30th IEEE/ACM International Conference on Automated Software Engineering (ASE), pp. 574-584. IEEE.

Paszke et al. "PyTorch: An Imperative Style, High-Performance Deep Learning Library" Advances in neural information processing systems 2019, 12 pages.

Pennington et al. "Glove: Global vectors for word representation" Proceedings of the 2014 conference on empirical methods in natural language processing (EMNLP). 12 pages.

Sachdev et al. "Retrieval on Source Code: A Neural Code Search" Proceedings of the 2nd ACM SIGPLAN International Workshop on Machine Learning and Programming Languages, pp. 31-41.

Schlichtkrull et al. "Modeling Relational Data with Graph Convolutional Networks" arXiv:1703.06103v4 [stat.ML] Oct. 26, 2017, 9 pages.

(56) References Cited

OTHER PUBLICATIONS

Slonneger et al. "Formal Syntax and Semantics of Programming Languages: A Laboratory Based Approach" Addison Wesley Longman, 1994, 654 pages.
Wan et al."Multi-Modal Attention Network Learning for Semantic Source Code Retrieval" arXiv:1909.13516v1 [cs.SE] Sep. 30, 2019, 13 pages.
Wang et al. "A Compare-Aggregate Model for Matching Ext Sequences" arXiv:1611.01747v1 [cs.CL] Nov. 6, 2016, 11 pages.
Wang et al. "Bilateral Multi-Perspective Matching for Natural Language Sentences" arXiv:1702.03814v3 [cs.AI] Jul. 14, 2017, 7 pages.
Xie et al. "Crystal Graph Convolutional Neural Networks for an Accurate and Interpretable Prediction of Material Properties" arXiv:1710.10324v3 [cond-mat.mtrl-sci] Apr. 6, 2018, 15 pages.
Yao et al. "CoaCor: Code Annotation for Code Retrieval with Reinforcement Learning" arXiv:1904.00720v1 [cs.SE] Mar. 13, 2019, 12 pages.
Mell, Peter, et al. "The NIST Definition of Cloud Computing." National Institute of Standards and Technology. Sep. 2011. 7 pages.

\* cited by examiner

802

| Dataset | # Training | # Validation | # Testing |
|---|---|---|---|
| JAVA® | 216,259 | 9,000 | 1,000 |
| PYTHON® | 312,189 | 17,215 | 1,000 |

806

| Dataset | Model | MRR | S@1 | S@5 | S@10 |
|---|---|---|---|---|---|
| JAVA® | DGMS (MPNN) | 85.8 | 79.0 | 94.3 | 96.7 |
| | DGMS (CGCN) | 85.6 | 78.6 | 94.4 | 96.0 |
| | DGMS | 87.9 | 81.7 | 95.5 | 96.7 |
| PYTHON® | DGMS (MPNN) | 91.8 | 87.3 | 97.9 | 98.9 |
| | DGMS (CGCN) | 92.5 | 88.2 | 97.9 | 99.1 |
| | DGMS | 92.2 | 87.6 | 97.7 | 98.9 |

804

| Dataset | Model | MRR | S@1 | S@5 | S@10 |
|---|---|---|---|---|---|
| JAVA® | Neural BoW | 77.7 | 71.3 | 85.3 | 88.5 |
| | RNN | 71.7 | 63.0 | 83.2 | 88.6 |
| | 1D-CNN | 22.6 | 12.3 | 32.7 | 45.7 |
| | Self-Attention | 65.3 | 54.4 | 79.1 | 84.2 |
| | DeepCS | 78.9 | 70.6 | 89.6 | 94.2 |
| | UNIF | 84.8 | 78.1 | 92.5 | 95.7 |
| | CAT | 20.6 | 10.1 | 28.9 | 41.5 |
| | DGMS | 87.9 | 81.7 | 95.5 | 96.7 |
| PYTHON® | Neural BoW | 66.0 | 56.2 | 78.3 | 83.2 |
| | RNN | 62.7 | 52.8 | 73.1 | 81.6 |
| | 1D-CNN | 18.4 | 10.5 | 25.1 | 33.6 |
| | Self-Attention | 63.9 | 54.5 | 75.3 | 82.1 |
| | DeepCS | 64.4 | 52.2 | 78.2 | 88.3 |
| | UNIF | 59.3 | 47.0 | 73.5 | 83.2 |
| | CAT | 70.1 | 59.7 | 83.8 | 90.3 |
| | DGMS | 92.2 | 87.6 | 97.7 | 98.9 |

808

| Dataset | Model | MRR | S@1 | S@5 | S@10 |
|---|---|---|---|---|---|
| JAVA® | DGMS-No | 75.5 | 64.3 | 89.6 | 93.8 |
| | DGMS-Sub | 78.0 | 68.9 | 89.7 | 94.5 |
| | DGMS-Mul | 78.2 | 68.1 | 91.4 | 95.3 |
| | DGMS | 87.9 | 81.7 | 95.5 | 96.7 |
| PYTHON® | DGMS-No | 79.2 | 70.7 | 90.5 | 94.8 |
| | DGMS-Sub | 82.5 | 74.9 | 92.1 | 95.9 |
| | DGMS-Mul | 85.4 | 77.5 | 95.5 | 97.9 |
| | DGMS | 92.2 | 87.6 | 97.7 | 98.9 |

| Datasets | Models | Aggregations | MRR | S@1 | S@5 | S@10 |
|---|---|---|---|---|---|---|
| JAVA® | DGMS-Sub | Average | 64.4 | 51.7 | 79.7 | 89.7 |
| | | Max | 66.6 | 53.9 | 83.0 | 90.4 |
| | | FCAvg | 73.7 | 62.3 | 87.5 | 92.6 |
| | | FCMax | 78.0 | 68.9 | 89.7 | 94.5 |
| | DGMS-Mul | Average | 45.8 | 28.3 | 70.0 | 84.5 |
| | | Max | 51.5 | 33.6 | 75.2 | 87.6 |
| | | FCAvg | 78.1 | 68.2 | 91.0 | 95.1 |
| | | FCMax | 78.2 | 68.1 | 91.4 | 95.3 |
| | DGMS-SubMul | Average | 83.8 | 74.9 | 95.9 | 96.8 |
| | | Max | 81.8 | 71.3 | 95.5 | 96.0 |
| | | FCAvg | 85.6 | 78.1 | 94.8 | 97.0 |
| | | FCMax | 87.9 | 81.7 | 95.5 | 96.7 |
| PYTHON® | DGMS-Sub | Average | 62.4 | 49.2 | 79.5 | 89.3 |
| | | Max | 65.6 | 53.5 | 82.4 | 90.7 |
| | | FCAvg | 74.9 | 64.1 | 88.5 | 94.8 |
| | | FCMax | 82.5 | 74.9 | 92.1 | 95.9 |
| | DGMS-Mul | Average | 46.7 | 27.7 | 71.9 | 86.6 |
| | | Max | 48.0 | 28.9 | 73.7 | 88.0 |
| | | FCAvg | 81.6 | 72.4 | 92.4 | 96.6 |
| | | FCMax | 85.4 | 77.5 | 95.5 | 97.9 |
| | DGMS-SubMul | Average | 89.5 | 83.1 | 97.2 | 98.7 |
| | | Max | 85.7 | 76.7 | 97.0 | 98.7 |
| | | FCAvg | 89.7 | 84.0 | 96.8 | 98.4 |
| | | FCMax | 92.2 | 87.6 | 97.7 | 98.9 |

FIG. 10

SEMANTIC CODE RETRIEVAL USING GRAPH MATCHING

BACKGROUND

The subject disclosure relates to one or more graph neural network based models for semantic code retrieval, and more specifically, to matching a computer programing code to a natural language query based on one or more node neural network embeddings that can encode graph structure information of graph representations of the query and the code.

Code retrieval is a machine learning task aimed to retrieve computer program code snippets that match the query of a natural language description. The one or more code snippets can be sourced from one or more large corpora of source code repositories. Code retrieval over billions of lines of source codes has become a key challenge in software engineering. Given a natural language described query, the goal of a code retrieval task can be to find the best matching code snippet. Code retrieval tools can not only find a standard syntax usage of specific programming language but can also help programmers quickly retrieve previously written code snippets for certain functionality and reuse them, which largely accelerate software development for programmers and enhance code re-use.

To deal with the task of code retrieval, traditional approaches mainly employ information retrieval techniques that treat source codes as a collection of documents and perform keyword searching over them. However, these information retrieval-based approaches have difficulty in understanding the semantics of both query texts and source codes. Additionally, some traditional approaches employ sequence encoder models for both query texts and source codes, then make a decision according to a similarity score between the learned distributed representations. However, traditional approaches suffer from at least two major challenges: (1) sequence encoder models cannot capture the structural information of the query and/or code repository (e.g., the source codes can have various dependency features include long-range dependencies that are not captured by traditional approaches); and (2) the lack of exploration of different levels of semantic relationship between query texts and codes makes these traditional models unable to align a many-to-many relationship between at least two types of representations (e.g., a distributed representation) with fine-granularity.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can execute one or more code retrieval tasks are described.

According to an embodiment, a system is provided. The system can comprise a memory that can store computer executable components. The system can also comprise a processor, operably coupled to the memory, and that can execute the computer executable components stored in the memory. The computer executable components can comprise a code retrieval component that can execute a code retrieval machine learning task by computing an amount of similarity between neural network embeddings of graph representations of a query text and at least a portion of a computer program code. An advantage of such a system can be the consideration of semantic contexts during the code retrieval task.

In some examples, the system can comprise an encoding component that can encode the neural network embeddings from the graph representation of the query text and the graph representation of the portion of computer program code by employing a graph neural network. An advantage of such a system can be that semantic information can be encoded from the structure of the graph representations.

According to an embodiment, a computer-implemented method is provided. The computer-implemented method can comprise executing, by a system operatively coupled to a processor, a code retrieval machine learning task by computing an amount of similarity between neural network embeddings of graph representations of a query text and a portion of a computer program code. An advantage of such a computer-implemented method can be a narrowing of one or more semantic gaps between the structure of the query text and the computer program code.

In some examples, the computer-implemented method can further comprise generating, by the system, a graph representation of the query text by executing a semantic parsing algorithm. Also, the computer-implemented method can comprise generating, by the system, a graph representation of the portion of computer program code. An advantage of such a computer-implemented method can be the representation of the both the query text and the computer program code from a unified graph perspective.

According to an embodiment, a computer program product for matching a computer program code to a query text is provided. The computer program product can comprise a computer readable storage medium having program instructions embodied therewith. The program instructions can be executable by a processor to cause the processor to execute, by the processor, a code retrieval machine learning task by computing an amount of similarity between neural network embeddings of graph representations of a query text and a portion of the computer program code. An advantage of such a computer program product can be the leveraging of graph structure information between the graph representations during execution of the code retrieval task.

In some examples, the program instructions can further cause the processor to enrich, by the processor, the neural network embeddings by executing a cross-attention based semantic matching operation between the graph representation of the query text and the graph representation of the portion of computer program code. An advantage of such a computer program product can be the exploration of fine grained semantic relations between the graph representations.

BRIEF DESCRIPTION OF THE DRAWINGS

FIG. 8 illustrates a diagram of example, non-limiting tables that can demonstrate the efficacy of one or more graph neural network based approaches to perform a semantic code retrieval task in accordance with one or more embodiments described herein.

FIG. 10 illustrates a diagram of an example, non-limiting table that can demonstrate the efficacy of one or more graph neural network based approaches to perform a semantic code retrieval task in accordance with one or more embodiments described herein.

DETAILED DESCRIPTION

Figure 1:
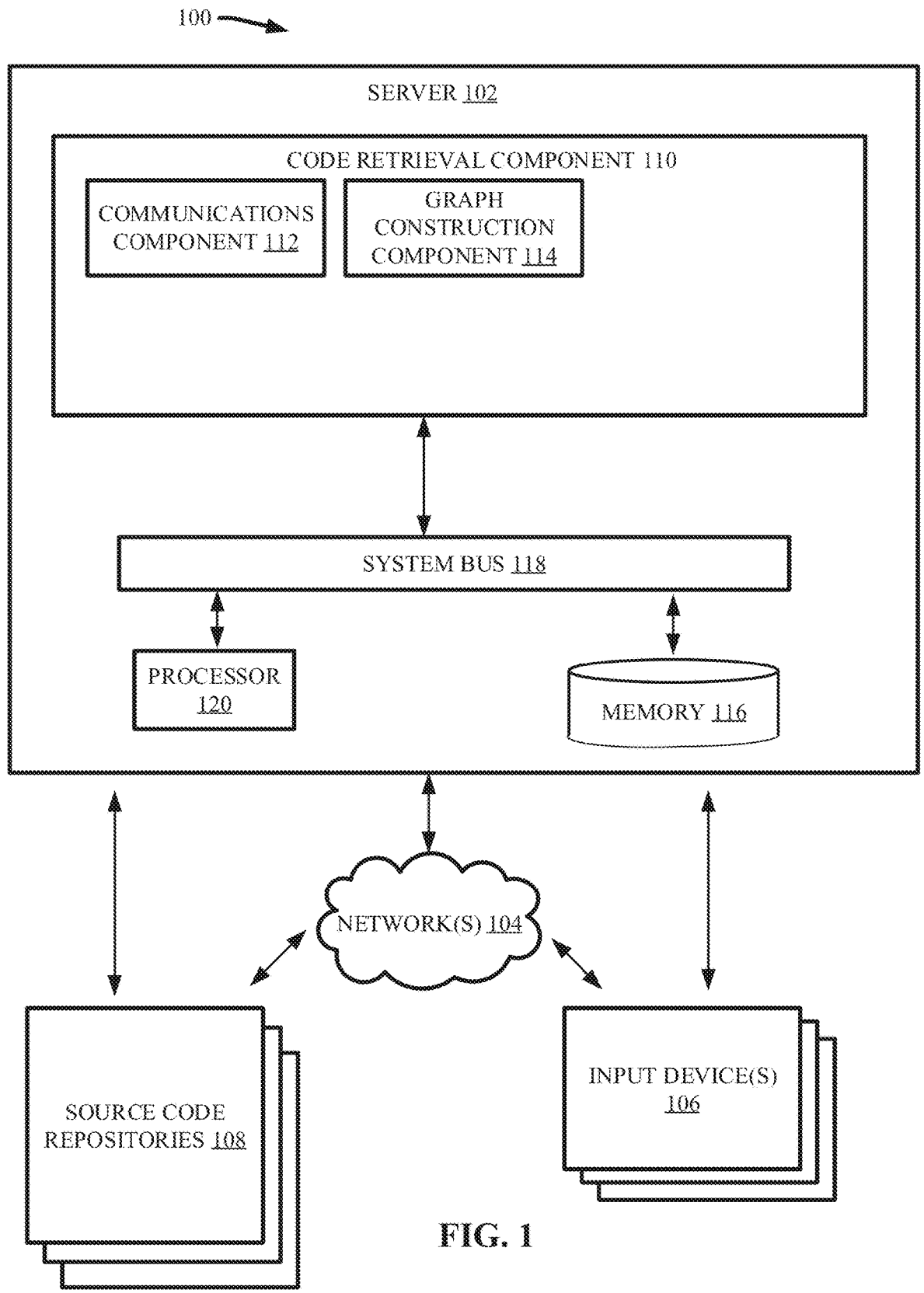
FIG. 1 illustrates a block diagram of an example, non-limiting system that can implement an end-to-end semantic code retrieval task based on graph neural networks in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of code retrieval tasks; the present disclosure can be implemented to produce a solution to one or more of these problems by employing an end-to-end graph based model that can exploit rich structural information in both natural language query texts and code repositories. Advantageously, one or more embodiments described herein can reduce a semantic gap between the structure of the query text and the source codes stored in the code repositories. Additionally, one or more embodiments described herein can advantageously encode graph structure information via graph neural networks ("GNNs") to facilitate a search for candidate source code snippets that match the natural language query.

Various embodiments of the present invention can be directed to computer processing systems, computer-implemented methods, apparatus and/or computer program products that facilitate the efficient, effective, and autonomous (e.g., without direct human guidance) end-to-end graph matching and searching model based on GNNs for semantic code retrieval. For example, one or more embodiments described herein can implement a graph generation approach that represents both query texts and source codes from a unified graph perspective, where structural and semantic information can be largely retained. Additionally, various embodiments described herein can encode graph structure information of the graphs via one or more GNNs. For example, one or more embodiments described herein can employ GNNs to learn node embeddings for the graphs to capture semantic information. Further, node embeddings generated by the GNNs can be utilized to determine matching scores characterizing an amount of similarity between the text graph and a plurality of code graphs representing a plurality of source code snippets. Further, one or more embodiments described herein can employ a semantic matching operation based on cross-attention to explore fine-grained semantic relations between the text graph and corresponding code graph and update the embedding of each node in the graphs. By incorporating the graph structure information, the matching scores can explore fine-grained semantic relations between the query text and source code snippets.

The computer processing systems, computer-implemented methods, apparatus and/or computer program products employ hardware and/or software to solve problems that are highly technical in nature (e.g., querying one or more computer program code repositories), that are not abstract and cannot be performed as a set of mental acts by a human. For example, an individual, or a plurality of individuals, cannot encode query text graphs and/or source code graphs via one or more GNNs. Further, the various embodiments can employ machine learning technologies to search code repositories that can contain vast volumes of data that cannot be readily analyzed by a person with the effectiveness or efficiency described herein.

Also, one or more embodiments described herein can constitute a technical improvement over conventional code retrieval task approaches by exploiting graph structure information of the natural language query text and the source code snippets included in the code repositories for improving code matching accuracy and ranking performance. Additionally, various embodiments described herein can demonstrate a technical improvement over conventional code retrieval task approaches by employing a graph based approach to overcome semantic differences between the structure of the natural language query text and the one or more code snippets.

Further, one or more embodiments described herein can have a practical application by casting a code retrieval task as a graph based learning to rank task and leveraging neural network embeddings to encode graph structural information regarding semantic complexities. For example, one or more embodiments described herein can control a GNN, such as a relation graph convolutional network ("RGCN"), for encoding the text graph representing a natural language query and code graphs representing respective programming language code snippets. Thereby, the one or more embodiments can perform code matching techniques that incorporate the graph structure information.

As used herein, the term "machine learning task" can refer to an application of artificial intelligence technologies to automatically and/or autonomously learn and/or improve from an experience (e.g., training data) without explicit programming of the lesson learned and/or improved. For example, machine learning tasks can utilize one or more algorithms to facilitate supervised and/or unsupervised learning to perform tasks such as classification, regression, and/or clustering. Execution of a machine learning task can be facilitated by one or more artificial intelligence models trained on one or more datasets in accordance with one or more model configuration settings.

As used herein, the term "neural network" can refer to a computer model that can be used to facilitate one or more machine learning tasks, wherein the computer model can simulate a number of interconnected processing units that can resemble abstract versions of neurons. For example, the processing units can be arranged in a plurality of layers (e.g., one or more input layers, one or more hidden layers, and/or one or more output layers) connected by varying connection strengths (e.g., which can be commonly referred to within the art as "weights"). Neural networks can learn through training, wherein data with known outcomes is inputted into the computer model, outputs regarding the data are compared to the known outcomes, and/or the weights of the computer model are autonomous adjusted based on the comparison to replicate the known outcomes. As used herein, the term "training data" can refer to data and/or data sets used to train one or more neural network models. As a neural network trains (e.g., utilizes more training data), the computer model can become increasingly accurate; thus, trained neural network can accurately analyze data with unknown outcomes, based on lessons learned from training data, to facilitate one or more machine learning tasks. Example neural network can include, but are not limited to: perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), deconvolutional network ("DN"), deep convolutional inverse graphics network ("DCIGN"), generative adversarial network ("GAN"), liquid state machine ("LSM"), extreme learning machine ("ELM"), echo state network ("ESN"), deep residual network ("DRN"), kohonen network ("KN"), support vector machine ("SVM"), multilayer perceptron ("MLP"), and/or neural turing machine ("NTM").

FIG. 1 illustrates a block diagram of an example, non-limiting system 100 that can execute one or more code retrieval tasks. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, input devices 106, and/or source code repositories 108. The server 102 can comprise code retrieval component 110. The code retrieval component 110 can further comprise communications component 112 and/or graph construction component 114. Also, the server 102 can comprise or otherwise be associated with at least one memory 116. The server 102 can further comprise a system bus 118 that can couple to various components such as, but not limited to, the code retrieval component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or source code repositories 108 (and vice versa) using virtually any desired wired or wireless technology including for example, but not limited to: cellular, WAN, wireless fidelity (Wi-Fi), Wi-Max, WLAN, BLUETOOTH® technology, a combination thereof, and/or the like. Further, although in the embodiment shown the code retrieval component 110 can be provided on the one or more servers 102, it should be appreciated that the architecture of system 100 is not so limited. For example, the code retrieval component 110, or one or more components of retrieval component 110, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more natural language queries into the system 100, thereby sharing (e.g., via a direct connection and/or via the one or more networks 104) said query data with the server 102. For example, the one or more natural language queries can include text describing one or more characteristics and/or functions of a desired computer programming code targeted for retrieval from the one or more source code repositories 108. The one or more input devices 106 can send query data to the communications component 112 (e.g., via a direct connection and/or via the one or more networks 104). Additionally, the one or more input devices 106 can comprise one or more displays that can present one or more outputs generated by the system 100. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

In one or more embodiments, the one or more source code repositories 108 can be software archives of computer programming source codes. The source codes can be computer program codes previously developed for one or more functions and stored in the one or more source code repositories 108 for later use. For example, the source codes can be retrieved from the one or more source code repositories 108 to execute the original function of the code and/or to be modified in order to execute a different function. Constructing new programming codes by modifying existing source codes can expedite the program development process. In various embodiments, the one or more source code repositories 108 can include one or more source code archives, a hosting facility for managing and/or accessing the archives, technical documentations, web pages, snippets, patches, a combination thereof, and/or the like. In one or more embodiments, the code retrieval component 110 can retrieve a snippet of a source code stored in the one or more source code repositories 108 based on natural language query submitted via the one or more input devices 106.

In various embodiments, the graph construction component 114 can construct unified graph representations for both query texts entered via the one or more input devices 106 and source codes (e.g., source code snippets) from the one or more source code repositories 108. In one or more embodiments, the text and/or code graphs constructed by the graph construction component 114 can be directed and labeled multigraphs, where different edge types can be encoded by label edges. For example, the query texts and the archived source code can have semantic structure information (e.g., various dependency features) that can be characterized by graph structure information. In one or more embodiments, one or more code queries can be natural language text entered into the system 100 via the one or more input devices 106. The one or more code queries can describe one or more characteristics of a source code (e.g., source code snippet) targeted for retrieval by the code retrieval component 110.

In one or more embodiments, the graph construction component 114 can construct one or more text graphs representing the one or more natural language query texts. For example, the graph construction component 114 can execute one or more semantic parsing algorithms to construct the one or more text graphs. For instance, the one or more text graphs can be constituency parse tree with word ordering features that can provide both constituent and order information of sentences. In one or more embodiments, the one or more text graphs (e.g., constituency parse tree) can represent the constituent structure of natural languages based on context-free grammar and can be defined by a tuple $\langle N, \Sigma, R, s \rangle$. Where "N" can be a set of non-terminal symbols, "$\Sigma$" can be a set of terminal symbols (e.g., disjointed from "N"), "R" can be a set of grammar rules $R:N \rightarrow (\Sigma \cup N)^*$ that can map a non-terminal symbol to a list of its subnodes, and $s \in N$ can be the designated root symbol. For instance, a constituency tree structure can be constructed using natural language processing ("NPL") tools.

Further, the graph construction component 114 can incorporate the word ordering information of sentences into the one or more text graphs. For example, the graph construction component 114 can link the words (e.g., the terminal symbols in the constituency tree) of sentences in a chain, which can capture the forward and backward contextual information of sentences. For instance, the graph construction component 114 can link the terminal nodes in the constituency tree structure with bi-directional edges. By combining both constituent and word ordering information of sentences into a graph structure, the graph construction component 114 can generate an informative text graph representation of the natural language query text.

In one or more embodiments, the graph construction component 114 can construct one or more code graphs representing the one or more source codes archived in the one or more source code repositories 108. In various embodiments, the one or more source codes can include a plurality of snippets, where the graph construction component 114 can construct a code graph for each respective snippet. Further, the graph construction component 114 can generate the one or more code graphs using a program graph structure. For instance, the program graph structure of the one or more code graphs can be based on abstract syntax tree ("AST") representations of the source codes. The AST of the source codes can be in analogy to the constituency parse tree of the one or more text graphs.

For example, the one or more code graphs can have a program graph structure that can include syntax nodes (e.g., corresponding to terminal/non-terminal nodes in AST) and syntax tokens (e.g., values of terminal noes in the original source code). Additionally, different types of edges can be employed to model the syntactic and semantic relationship between nodes and/or tokens. By constructing the one or more text graphs with a constituency parsing tree structure and the one or more code graphs with a program graph structure, the graph construction component 114 can represent both the query texts and the source codes from a unified graph perspective.

Figure 2:
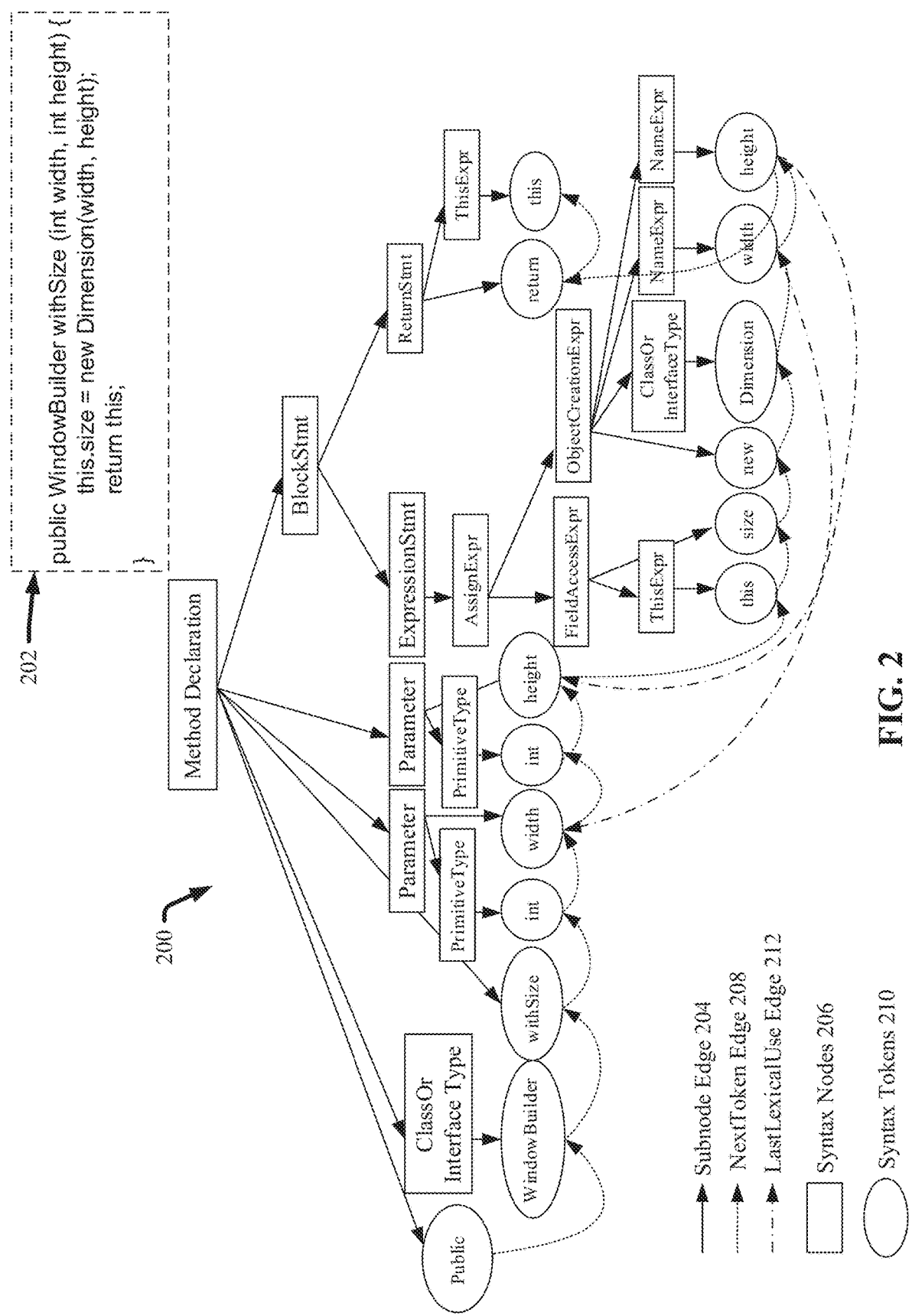
FIG. 2 illustrates diagram of an example, non-limiting graph that can be constructed from computer programming language codes to facilitate a semantic code retrieval task in accordance with one or more embodiments described herein.

FIG. 2 illustrates a diagram of an example, non-limiting code graph 200 that can be constructed by the graph construction component 114 in accordance with one or more embodiments described herein. Repetitive description of like elements employed in other embodiments described herein is omitted for sake of brevity. As shown in FIG. 2, the code graph 200 can represent the source code snippet 202, which can be comprised within the one or more source code repositories 108. The exemplary source code snippet 202 shown in FIG. 2 can be in a programing language, such as a JAVA® function.

As shown in FIG. 2, the exemplary code graph 200 can be generated by the graph construction component 114 and can have a program graph structure that can characterize syntax and semantic relations of the corresponding source code (e.g., exemplary source code snippet 202). For instance, the exemplary code graph 200 can explore multiple edge types, including, but not limited to: "subnode edges" 204 (e.g., represented by solid arrows in FIG. 2), which can connect syntax nodes 206 (e.g., represented by solid line boxes in FIG. 2) in AST; "NextToken" edges 208 (e.g., represented by dotted arrows in FIG. 2), which can connect each syntax token 210 (e.g., represented by solid line circles in FIG. 2) to its successor in the original source code (e.g., in the exemplary source code snippet 202); and/or "LastLexicalUse" edges 212 (e.g., represented by dot-dash lines in FIG.

2), which can connect identifiers to their most recent lexical usage. In one or more embodiments the graph construction component 114 can generate a code graph with all three example edge types, or two of the example edge types. For example, the graph construction component 114 can construct one or more code graphs with the NextToken edges 208 and store the sequence of tokens of the nodes.

Figure 3:
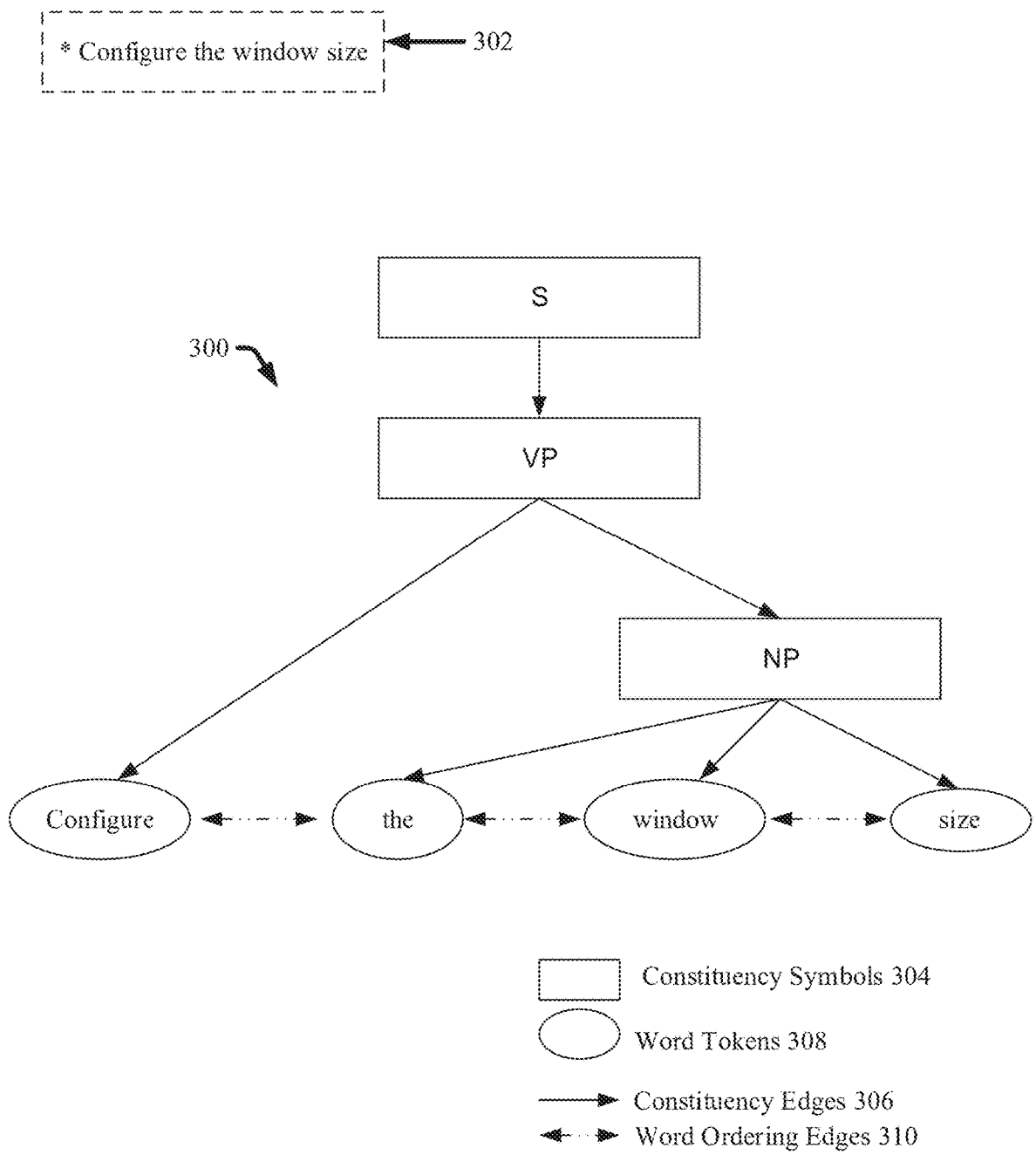
FIG. 3 illustrates diagram of an example, non-limiting graph that can be constructed from a natural language query text to facilitate a semantic code retrieval task in accordance with one or more embodiments described herein.

FIG. 3 illustrates a diagram of an example, non-limiting text graph 300 that can be constructed by the graph construction component 114 in accordance with one or more embodiments described herein. Repetitive description of like elements employed in other embodiments described herein is omitted for sake of brevity. As shown in FIG. 3, the text graph 300 can represent the natural language query text 302, which can be entered into the system 100 via the one or more input devices 106 to direct the code retrieval machine learning task executed by the code retrieval component 110.

As shown in FIG. 3, the exemplary text graph 300 can be generated by the graph construction component 114 and can have a constituency parse tree structure that can characterize semantic relations of the corresponding query (e.g., exemplary query text 302). For instance, the exemplary text graph 300 can explore multiple constituency symbols 304 (e.g., represented by solid boxes in FIG. 3), including, but not limited to: the "S" constituency symbol 304, which can represent a simple declarative clause; the "VP" constituency symbol 304, which can represent a verb phrase; the "NP" constituency symbol 304, which can represent a noun phrase; and/or one or more article constituency symbols 304, which can represent one or more noun phrases (e.g., "the" in the exemplary text graph 300). Also shown in FIG. 3, constituency edges 306 of the exemplary text graph 300 can connect the constituency symbols 304 and/or word tokens 308. Further, word ordering edges 310 can connect word tokens 308. Thereby, one or more semantic relations of the query text (e.g., exemplary natural language query text 302) can be characterized by the various dependencies represented by the interdependencies of the edges.

Once the graph construction component 114 has constructed the one or more text graphs and/or code graphs, the code retrieval component 110 can compare an amount of similarity between the graphs to facilitate one or more code retrieval machine learning tasks. For example, given a corpus of source codes "E" with a total number of |E| code snippets, the code retrieval component 110 can identify the best matching code snippet "ê" from corpus "E" according to the query text "q", as characterized by Equation 1 below.

$$\hat{e} = \underset{e \in E}{\mathrm{argmax}}\, sim(q, e) = \underset{e \in E}{\mathrm{argmax}}\, sim(G_q, G_e) \qquad (1)$$

Where the core of the task can be to compute the similarity score sim(q, e). As both the query text and the source code snippets can be represented with graph data structures, the code retrieval component 110 can formulate sim(q, e) as $sim(G_q, G_e)$, where "$G_q$" and "$G_e$" can be graph representations for the text "q" and the code "e", respectively.

As described herein, the text and/or code graphs constructed by the graph construction component 114 can be directed and labeled multigraphs, where different edge types can be encoded by label edges. For example, the text graph "$G_q$" can be represented as ($V_q$, $\varepsilon_q$, $\mathcal{R}_q$) with nodes $q_i \in V_q$ and edges ($q_i$, r, $q_j$)$\in \varepsilon_q$, where r$\in \mathcal{R}_q$ can denote edge type. Similarly, the one or more code graphs "$G_e$" can be represented as ($V_e$, $\varepsilon_e$, $\mathcal{R}_e$). Further, the number of nodes of the test graph "$G_q$" and code graph "$G_e$" can be integers "M" and "N", respectively.

Figure 4:
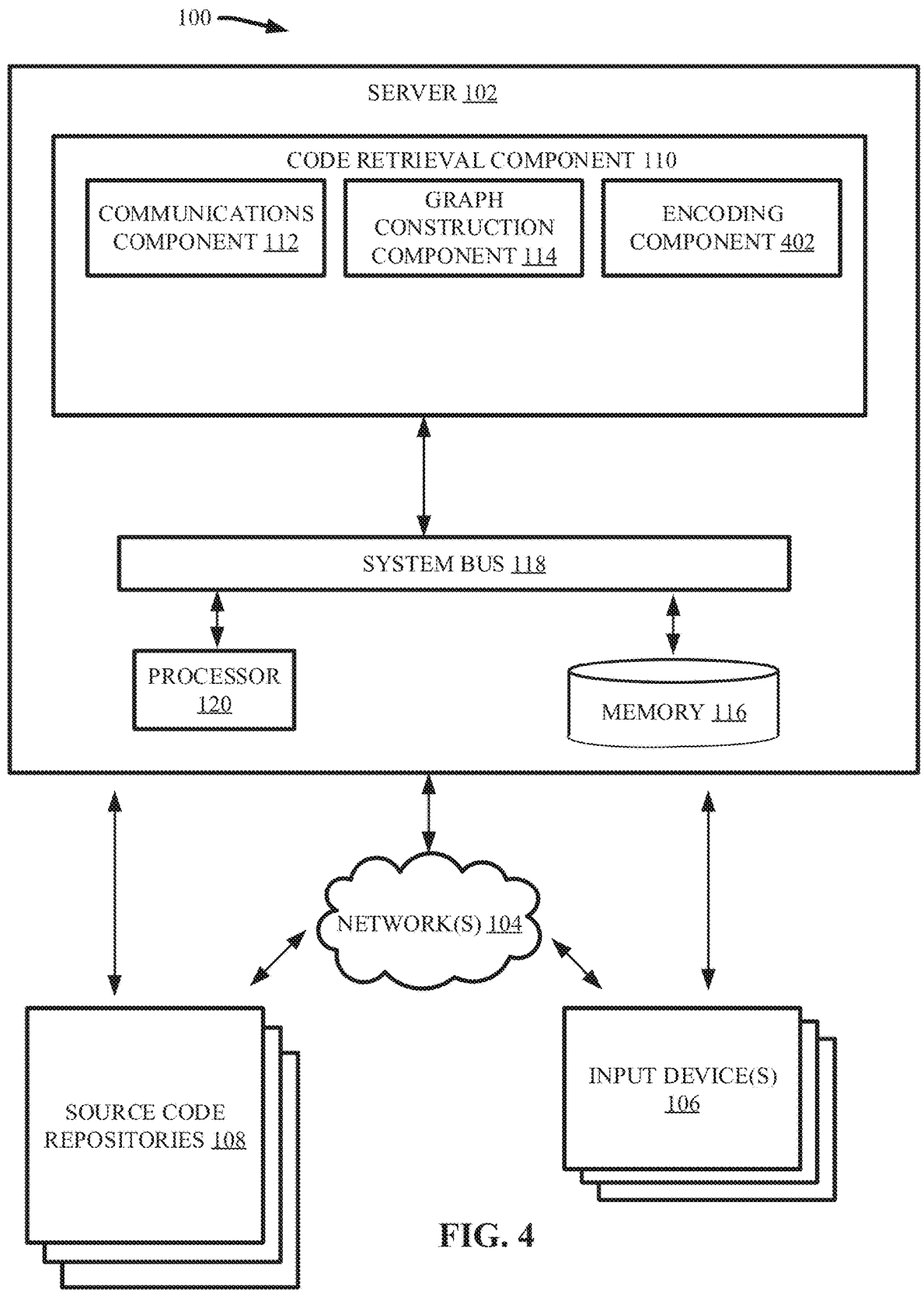
FIG. 4 illustrates a diagram of an example, non-limiting system that can encode graph structure information to bridge one or more semantic gaps in executing a code retrieval task in accordance with one or more embodiments described herein.

FIG. 4 illustrates a diagram of the example, non-limiting system 100 further comprising encoding component 402 in accordance with one or more embodiments described herein. Repetitive description of like elements employed in other embodiments described herein is omitted for sake of brevity. In various embodiments, the encoding component 402 can encode graph structure information of the one or more text graphs and/or code graphs into node neural network embeddings. Example graph structure information that can be encoded by the encoding component 402 can include, but is not limited to: node attributes, interdependencies between nodes, the positioning of nodes within the graph structure, which nodes neighbor each other, types of nodes, edge connectivity, a combination thereof, and/or like. In one or more embodiments, encoding the graph structure information can incorporate semantic information of the query text and/or source code snippets into the code retrieval task.

In various embodiments, the encoding component 402 can employ one or more GNNs to learn node embeddings for the one or more text graphs and/or code graphs. The encoding component 402 can employ a GNN that considers graph structure and node attributes as inputs. For example, the encoding component 402 can employ a relational graph convolutional network ("RGCN") to generate the node embeddings. Other example types of GNNs that can be employed by encoding component 402 to generate one or more node neural network embeddings from the one or more text graphs and/or code graphs can include, but are not limited to: RGCNs, message passing neural networks ("MPNNs"), crystal graph convolutional neural networks ("CGCNs"), a combination thereof, and/or the like.

For example, with regards to the text graph $G_q=(V_q, \varepsilon_q, \mathcal{R}_q)$, the propagation process of RGCN updating each node $q_i \in V_q$ can be in accordance with Equation 2 below.

$$q_i^{(l+1)} = \mathrm{ReLU}\left(W_\oplus^{(l)} q_i^{(l)} + \sum_{r \in \mathcal{R}} \sum_{j \in N_i^r} \frac{1}{|N_i^r|} W_r^{(l)} q_j^{(l)}\right) \qquad (2)$$

Where "$q_i^{(l+1)}$" can denote the updated vector of node embeddings of node $q_i$ in the (l+1) layer, "$\mathcal{R}$" can denote the set of relations (e.g., edge types), "$\mathcal{N}_i^r$" can be the set of neighbors of node $q_i$ under the edge type r$\in \mathcal{R}$, and "$W_\oplus^{(l)}$" and "$W_\oplus^{(l)}$" can be parameters of the RGCN model to be learned. By encoding both the query text and the source code snippets with the GNNs (e.g., RGCN), the encoding component 402 can generate both node neural network embeddings: $X_q = \{q_i\}_{i=1}^M \in \mathbb{R}^{(M,d)}$ for text graph $G_q$; and $X_e = \{e_j\}_{j=1}^N \in \mathbb{R}^{(N,d)}$ for code graph $G_e$. Further, "d" can represent the embedding size of each node.

Figure 5:
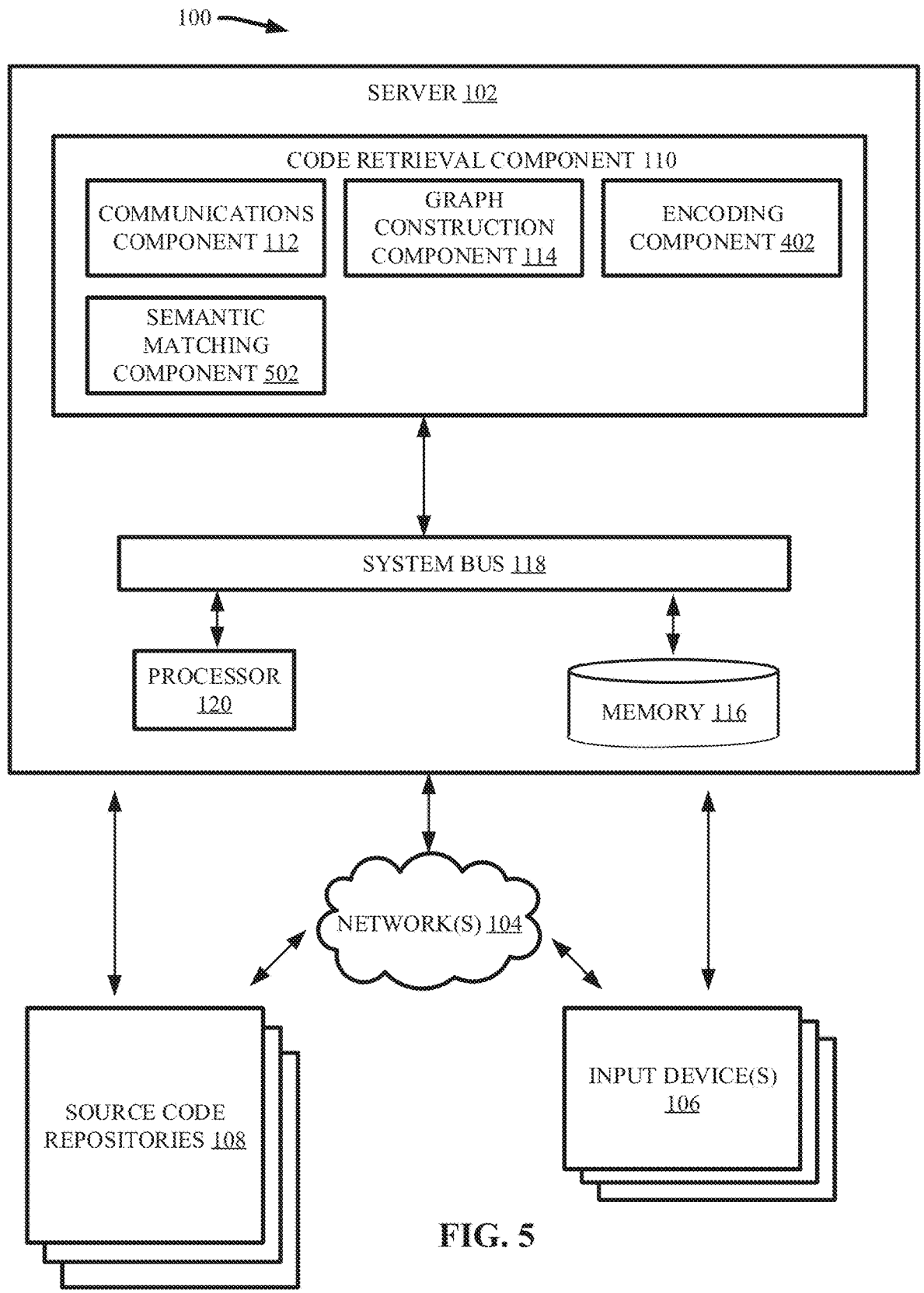
FIG. 5 illustrates a diagram of an example, non-limiting system that can perform fine-grained matching tasks over graph structures of program source code and/or query text in accordance with one or more embodiments described herein.

FIG. 5 illustrates a diagram of the example, non-limiting system 100 further comprising semantic matching component 502 in accordance with one or more embodiments described herein. Repetitive description of like elements employed in other embodiments described herein is omitted for sake of brevity. In various embodiments, the semantic matching component 502 can implement a cross-attention based semantic matching operation "$f_{match}$" for exploring fine-grained semantic relations between the one or more text graphs and code graphs to update and enrich the node neural network embeddings of both graphs.

For example, the semantic matching component 502 can execute one or more similarity algorithms. For instance, the semantic matching component 502 can execute a cosine attention similarity algorithm between the pairs of each node in one graph and all nodes in another graph. For example, given node $q_l$, in $G_q$, the semantic matching component 502 can calculate a cross attention similarity between its node embedding and the node embedding of each node in a given code graph $G_e$ in accordance with Equation 3 below.

$$\alpha_{i,j} = \text{cosine}(q_i, e_j), \forall j=1, \ldots, N \quad (3)$$

Further, the semantic matching component 502 can compute the cosine attention "$\alpha_{i,j}$" as the weight of $e_j$ and compute a weighted-average over all node embeddings of the code graph $G_e$ by the corresponding cross attention scores with node $q_l$ in text graph $G_q$, which can yield a contextual global-level representation $\overline{e_G^i}$; of the code graph $G_e$ with respect to node $q_l$ in text graph $G_q$, in accordance with Equation 4 below.

$$\overline{e_G^i} = \frac{1}{N}\sum_j^N a_{i,j}e_j \quad (4)$$

Further, the semantic matching component 502 can execute one or more matching operations to further measure the relatedness between each pair of node embeddings in two graphs in accordance with Equations 5 and 6 below.

$$\hat{q}_i = \text{Sub}(q_i, \overline{e_G^i}) = (q_i - \overline{e_G^i}) \odot (\overline{e_G^i} - q_i) \quad (5)$$

$$\hat{q}_i = \text{Mul}(q_i, \overline{e_G^i}) = q_i \odot \overline{e_G^i} \quad (6)$$

Where "$\odot$" can denote the element-wise multiplication operation and the resulting $\hat{q}_i$ can have the same embedding size as $q_i$ or $\overline{e_G^i}$. For example, "Sub" and/or "Mul" can be respective comparison functions based on element-wise subtraction and multiplication operations. The subtraction comparison function "Sub" can be related to Euclidean distance in that Euclidean distance is the sum of all the entries of the vector produced by Sub. Similarly, the multiplication comparison function "Mul" can also be related to cosine similarity but can preserve some information about the original vectors. In one or more embodiments, the results of the two matching operations of Equations 5 and/or 6 can be concatenated to assemble another matching operation in accordance with Equation 7 below.

$$\hat{q}_i = \text{SubMul}(q_i, \overline{e_G^i}) \quad (7)$$
$$= \text{Concat}\left[\text{Sub}(q_i, \overline{e_G^i}), \text{Mul}(q_i, \overline{e_G^i})\right]$$

Where "Concat" can denote the concatenation operation and the resulting $\hat{q}_i$ can be twice the node embedding size of $q_i$ or $\overline{e_G^i}$.

Subsequent to performing the above semantic matching operation $f_{match}$ for both the text graph $G_q$ and code graphs $G_e$, the semantic matching component 502 can further update the node neural network embeddings as $X_q = \{\hat{q}_i\}_{i=1}^M \in \mathbb{R}^{(M,d')}$ and $X_e = \{\hat{e}_j\}_{j=1}^N \in \mathbb{R}^{(N,d')}$. Where "d'" can denote the updated node embedding size (e.g., d'=d for Sub/Mul, and d'=2d for SubMul).

Figure 6:
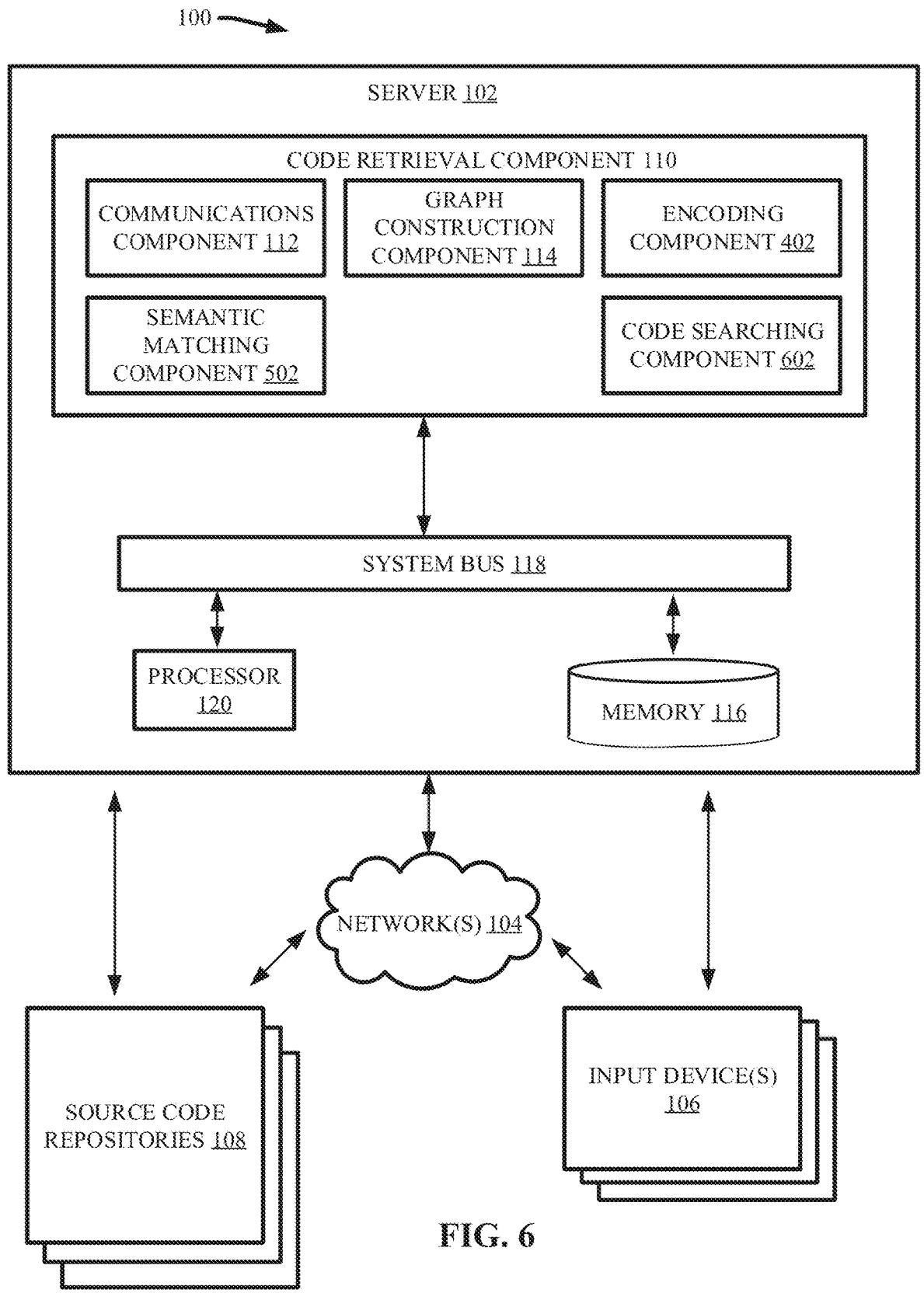
FIG. 6 illustrates a diagram of an example, non-limiting system that perform a code retrieval task based on a similarity score between graphical representations of program source code and query text in accordance with one or more embodiments described herein.

FIG. 6 illustrates a diagram of the example, non-limiting system 100 further comprising code searching component 602 in accordance with one or more embodiments described herein. Repetitive description of like elements employed in other embodiments described herein is omitted for sake of brevity. In various embodiments, the code searching component 602 can perform code searching over the graph representations of both the code snippets and query texts by aggregating a graph-level embedding for each graph. For example, the code searching component 602 can apply one or more graph pooling methods, such as pooling operation "FCMax" on the respective node neural network embeddings. Alternate aggregation operations that can be executed by the code searching component 602 can include, but are not limited to: average pooling (e.g., FCAvg), max pooling (e.g., FCMax), a combination thereof, and/or the like. The aggregation operation can operate over an unordered set of vectors and/or be invariant to permutations of its inputs.

For example, the pooling operation executed by the code searching component 602 can be a variant of the max pooling operation following a fully connected layer transformation in accordance with Equations 8 and 9 below.

$$H_q = FC\,\text{Max}(X_q) = \text{maxpooling}(FC(\{\hat{q}_i\}_{i=1}^M)) \quad (8)$$

$$H_e = FC\,\text{Max}(X_e) = \text{maxpooling}(FC(\{\hat{e}_i\}_{i=1}^N)) \quad (9)$$

The output dimension size of $H_e$ can depend on the hidden size of the fully-connected layer, which is set the same as d' (e.g., $H_q$ and $H_e \in d'$).

To measure the similarity score between the code snippet and the query text (e.g., sim(q, e) in Equation 1, the code searching component 602 can search for the best matching source code (e.g., code snippet) based on the cosine distance between the two learned distributed representations, as characterized by Equation 10 below.

$$\text{sim}(q,e) = \text{sim}(G_q, G_e) = \text{cosine}(H_q, H_e) \quad (10)$$

In various embodiments, the code retrieval component 110, including the one or more GNNs employed by the code retrieval component 110, can be trained in an end-to-end approach on a training data corpus comprising paired texts of natural language query and code snippets. For example, the training data corpus can be stored in the one or more memories 116. Where the training corpus in unavailable, the code retrieval component 110 can be trained using the document description of code snippets instead of the query text. For example, each training sample in $\mathcal{T}$ can be a triple $\langle q, e, \ddot{e} \rangle$, which can be constructed for each code e and its corresponding document text description q. The code retrieval component 110 can select a negative sample code $\ddot{e}$ from one or more other source codes. Thereby, the code retrieval component 110 can predict a higher cosine similarity sim(q, e) that sim(q, $\ddot{e}$). The margin ranking loss can be employed for optimization in accordance with Equation 11 below.

$$\mathcal{L}(\theta) = \sum_{(g,e,E) \in \mathcal{T}} \max(\delta - \text{sim}(q, e) + \text{sim}(q, \ddot{e}), 0) \quad (11)$$

Where "θ" can be the model parameters to be learned and "δ" can be the margin parameter of margin ranking loss.

In one or more embodiments, the code retrieval component 110 can be trained based on the Siamese network, which can use the shared RGCN model to build representations for both the query texts and the source codes. At least the sharing of the parameters of the model can render the model executed by the code retrieval component 110 smaller, thereby mitigating possible over-fitting and making the training process more efficient.

Figure 7:
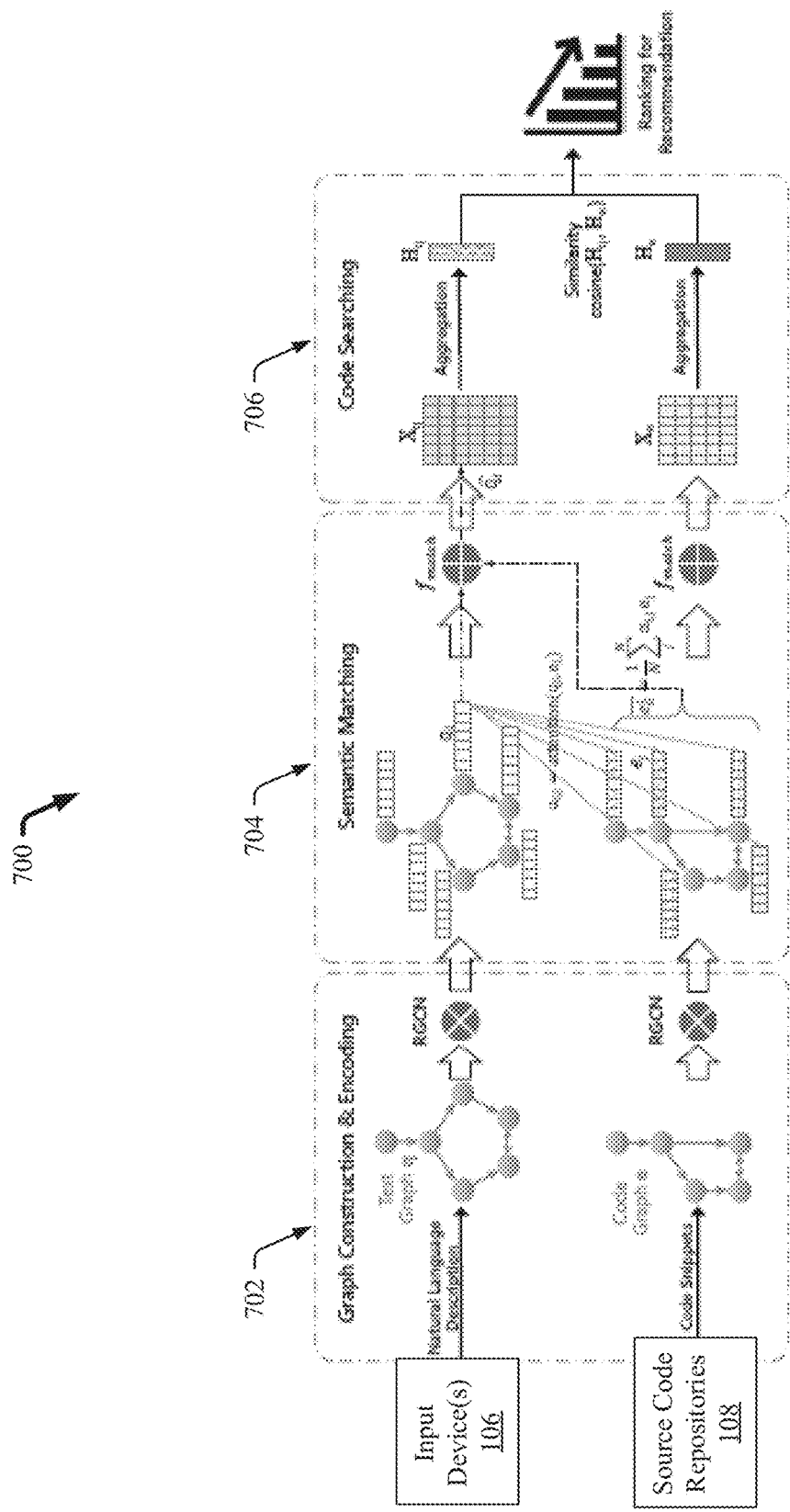
FIG. 7 illustrates a diagram of an example, non-limiting machine learning protocol that can be implemented by one or more systems to execute an end-to-end semantic code retrieval task based on graph neural networks in accordance with one or more embodiments described herein.

FIG. 7 illustrates a diagram of an example, non-limiting code retrieval model 700 that can be implemented by the code retrieval component 110 in accordance with one or more embodiments described herein. Repetitive description of like elements employed in other embodiments described herein is omitted for sake of brevity. As shown in FIG. 7, the code retrieval model 700 can include three modules: a graph construction and encoding module 702, a semantic matching module 704, and/or a code searching module 706.

In various embodiments, the graph construction and encoding module 702 can be executed by the graph construction component 114 and/or the encoding component 402. For example, one or more natural language descriptions of the one or more queries can be entered via the one or more input devices 106 and represented by one or more text graphs q. For instance, the graph construction component 114 can construct the one or more text graphs described herein using one or more semantic parsing algorithms, such as a constituent parsing algorithm. In one or more embodiments, the one or more text graphs can incorporate word ordering information. Exemplary text graph 300 can demonstrate one or more constituency parse tree structures and/or features that can be embodied by the one or more test graphs. Further, one or more code snippets can be retrieved from the one or more source code repositories 108 and represented by one or more code graphs e. For instance, the graph construction component 114 can construct the one or more code graphs described herein using one or more program graph algorithms. In one or more embodiments, the one or more code graphs can incorporate syntax and semantic information. Exemplary code graph 200 can demonstrate one or more program graph structures and/or features that can be embodied by the one or more code graphs. In various embodiments, the graph construction component 114 can thereby represent the natural language descriptions of the query and the code snippets of the source codes by unified graph representations.

Additionally, the graph construction and encoding module 702 can include one or more encoding operations executed by the encoding component 402. For example, the encoding component 402 can employ one or more GNNs, such as RGCNs, to compute neural network embeddings regarding the nodes of the one or more text and/or code graphs. The encoding component 402 can employ GNNs that can learn node embeddings of a graph with different edge types. In various embodiments, the encoding component 402 can employ one or more graph encoders, such as GNNs, that consider graph structure and node attributes as inputs. Example GNNs that can be employed by the encoding component 402 to encode the node embeddings can include, but are not limited to: RGCNs, MPNNs, CGCNs, a combination thereof, and/or the like.

In various embodiments, the semantic matching module 704 can be executed by the semantic matching component 502. For example, the semantic matching component 502 can implement a cross-attention based semantic matching operation (e.g., as represented in FIG. 7) for exploring fine-grained semantic relations between the one or more text graphs and corresponding code graphs to update and enrich the node embeddings of both graphs. For instance, the semantic matching component 502 can implement the cross-attention based semantic matching in accordance with Equations 3-7 described herein.

In various embodiments, the code searching module 706 can be executed by the code searching component 602. For example, the code searching component 602 can aggregate the graph-level embeddings for the one or more text graphs and code graphs by executing one or more pooling operations (e.g., FCMax) on the node embeddings (e.g., in accordance with Equations 8 and/or 9 described herein). Further, the code searching component 602 can determine one or more similarity scores between the text graph and the code graph by computing a distance measure (e.g., a cosine distance) between the aggregations. In various embodiments, the code retrieval component 110 can further rank the code graphs according to the computed similarity scores.

FIG. 8 illustrates a diagram of example, non-limiting tables that can demonstrate the efficacy of the code retrieval component 110 in accordance with one or more embodiments described herein. Repetitive description of like elements employed in other embodiments described herein is omitted for sake of brevity. For example, FIG. 8 can demonstrate the efficacy of exemplary code retrieval model 700, which can be implemented by the code retrieval component 110 in accordance with various embodiments described herein.

For instances, the results depicted in FIG. 8 can be achieved by the code retrieval component 110 using two datasets of two different and representative programming languages: JAVA® and PYTHON®. The JAVA® dataset and/or the PYTHON® dataset can be source code repositories 108 publicly available for evaluating code retrieval tasks. To render the datasets more suitable and/or practical for code retrieval evaluation, the datasets were preprocessed. For example, for each downloaded method or function, the data was parsed to a pure code snippet and a corresponding document comment (e.g., docstring, method-level description). Methods without docstrings were removed, as docstrings were treated as the query text in the performance evaluation characterized by the results of FIG. 8. Source codes with less than three lines were removed from the datasets. Additionally, source codes with descriptions containing non-English tokens and/or texts with less than three tokens were removed from the datasets. Further, duplicate description text was removed from the datasets. The preprocessing resulted in the JAVA® dataset containing 249, 072 pairs of source code and corresponding documental description, and the PYTHON® dataset containing 364, 891 pairs of source code and corresponding documental description.

Subsequent to the dataset preprocessing, the graph construction component 114 can generate the text and/or code graphs described herein from the datasets. The size of the graphs from both datasets can follow a long-tail distribution, and the graph construction component 114 can limit the number of nodes of the graphs to no more than 300, which can thereby keep more than 90% of the total datasets. Additionally, to facilitate evaluation of the code retrieval component 110, the datasets can be split into training data (e.g., 216,259 pairs from the JAVA® dataset and 312,189 pairs from the PYTHON® dataset), validation data (e.g., 9,000 pairs from the JAVA® dataset and 17,215 pairs from the PYTHON® dataset), and testing data (e.g., 1,000 pairs from the JAVA® dataset and 1,000 pairs from the PYTHON® dataset) in accordance with the statistics shown in table 800.

Further, the effectiveness of the code retrieval component 110 (e.g., implementing exemplary code retrieval model 700 in accordance with various embodiments described herein) can be evaluated in comparison to the following baseline models. A first model (e.g., represented in FIG. 8 as "Neural BoW") can first encode both query texts and code snippets with a bag-of-words ("BoW") neural network and then compute a similarity score between the code and text. A second model (e.g., represented in FIG. 8 as "RNN") can first encode both query texts and code snippets with a recurrent neural network ("RNN") and then compute a similarity score between the code and text. A third model (e.g., represented in FIG. 8 as "1D-CNN") can first encode both query texts and code snippets with a 1D convolutional neural network ("1D-CNN") and then compute a similarity score between the code and text. A fourth model (e.g., represented in FIG. 8 as "Self-Attention") can first encode both query texts and code snippets with a self-attention neural network and then compute a similarity score between the code and text. A fifth model (e.g., represented in FIG. 8 as "DeepCS") can capture the semantic information of code snippets from three perspectives: method name, application program interface ("API") call sequence, and/or code tokens. The fifth model can first separately encode the three different sequences with one or more RNN and multilayer perceptrons ("MLP") and then fuse encodings to generate a code representation. The fifth model can further encode the tokens associated with the query text with a RNN. The extraction method of API call sequences can be based on one or more heuristic approaches specific to JAVA®; thus, API call sequences for the fifth model can be omitted from the evaluation. A sixth model (e.g., represented in FIG. 8 as "UNIF") can use FastText to initialize the embeddings of the tokens in the query text and/or code snippets. Then the sixth model can aggregate the embeddings with learnable attention weights or average pooling operations. A seventh model (e.g., represented in FIG. 8 as "CAT") can use sequence encoders to represent code snippets based on both raw tokens and the converted string sequence of AST.

To facilitate the evaluation results depicted in FIG. 8, the code retrieval component 110 can use one layer of the RGCN employed in the exemplary code retrieval model 700 with the output node dimension of 100 and use a rectified linear unit ("ReLU") for activation. Since each node in the given graph contains one word token, the code retrieval component 110 can initialize each node with pre-trained embeddings from global vectors, where the dimension of one word embedding is 300. For those tokens that cannot be initialized from global vectors, the code retrieval component 110 can split the tokens into sub-tokens and use the average of the global vector pre-trained embeddings of sub-tokens for initialization. Otherwise, the code retrieval component 110 can initialize the embeddings with zeros. Further, the code retrieval component 110 can set the output size of the FCMax operation to 100.

To train the example code retrieval model 700 implemented to achieve the evaluation results depicted in FIG. 8, the margin δ can be fixed to 0.5, the batch size can be set to 10, and an Adam optimizer can be utilized with a learning rate of 0.0001. The code retrieval model 700 can be trained for 10 epochs, and the code retrieval component 110 can select the best model based on the lowest validation loss.

Two evaluation metrics can be employed to characterize the efficacy of the code retrieval model 700: mean reciprocal rank ("MRR") and success at k ("S@k"). MRR is the average of the reciprocal ranks of results for a set of queries Q. S@k can denote the percentage of queries for which more than one correct result exists in the top k ranked results. For both evaluation metrics, a higher metric value denotes better model performance.

Table 804 presents the experimental results of the code retrieval model 700 (e.g., represented as "DGMS" in FIG. 8) compared against the seven baseline models on both the JAVA® and the PYTHON® datasets. As shown in table 804, the code retrieval model 700 can outperform the baseline models on both datasets in terms of all four evaluation metrics: MRR, S@1, S@5, and S@10. For both the JAVA® and the PYTHON® datasets, the code retrieval model 700 can exhibit a performance of over 85% MRR, over 80% S@1, and over 95% S@5, which can characterize a low inspection effort of the model to retrieve the desired result for the code retrieval task. For instance, with regards to the PYTHON® code the code retrieval model 700 can have a markedly higher performance that the seven baseline models by a margin up to 22.1, 27.9, and 13.9 absolute value on MRR, S@1, and S@5, respectively.

High S@k values can denote a higher likelihood that the correct results exit in the top k ranked returned results. As shown in table 804, the S@1 score for the code retrieval model 700 is 81.7% for the JAVA® dataset and 87.6% for the PYTHON® dataset. For both the JAVA® and the PYTHON® datasets, the S@5 scores of the code retrieval model 700 are over 95%; thereby denoting that the code retrieval model 700 is statistically more likely to get the correct code snippet from the top returned ranked results. Otherwise, the code retrieval model 700 can retrieve the correct code snippet from the top 5 returned ranked results with over 05% probability.

Table 806 depicts the effects of the code retrieval component 110 (e.g., via encoding component 402) employing alternate GNNs to implement the code retrieval model 700. For example, the effects of employing a message passing neural network ("MPNN") and/or a crystal graph convolutional neural network ("CGN") are explored in table 806. The results associated with replacing the one or more RGCN encoders with one or more MPNN encoders are represented by "DGMS (MPNN)" in FIG. 8. The results associated with replacing the one or more RGCN encoders with one or more CGCN encoders are represented by "DGMS (CGCN)" in FIG. 8. Table 806 shows that employing model performance can be achieved with each of the encoder types, thereby demonstrating that the code retrieval model 700 is not sensitive to different relational GNNs in the graph construction and encoding module 702.

Table 804 depicts the effects of the code retrieval component 110 (e.g., semantic matching component 502) employing alternate operations of the semantic matching module 704 to implement the code retrieval model 700. As shown in table 806, "DGMS-No" can represent an implementation in which the code retrieval component 110 (e.g., semantic matching component 502) does not employ a semantic matching operation and instead applies the FCMax operation directly after the graph encoding. "DGMS-Sub" can represent an implementation in which the code retrieval component 110 (e.g., semantic matching component 502) employs just the Sub matching operations described herein (e.g., without the Mul matching operation). "DGMS-Mul" can represent an implementation in which the code retrieval component 110 (e.g., semantic matching component 502) employs just the Mul matching operations described herein (e.g., without the Sub matching operation). "DGMS" can represent an implementation in which the code retrieval component 110 (e.g., semantic matching component 502) employs the SubMul matching operation in accordance with the various embodiments described herein (e.g., characterized by Equations 5-7 described herein).

As shown in table 804 embodiments of the code retrieval model 700 that employ semantic matching operations (e.g., Sub, Mul, and/or SubMul operations) can achieve markedly better performance than embodiments that do not employ semantic matching operations. Thereby, table 804 denotes one or more advantages achieved by the semantic matching module 704 and/or the semantic matching component 502 described herein. Additionally, table 804 shows that embodiments of the code retrieval model 700 that employ SubMul operations can achieve the best performance results, thereby indicating that concatenation of Sub and Mul matching operations can capture more interaction features than each operation individually.

Figure 9:
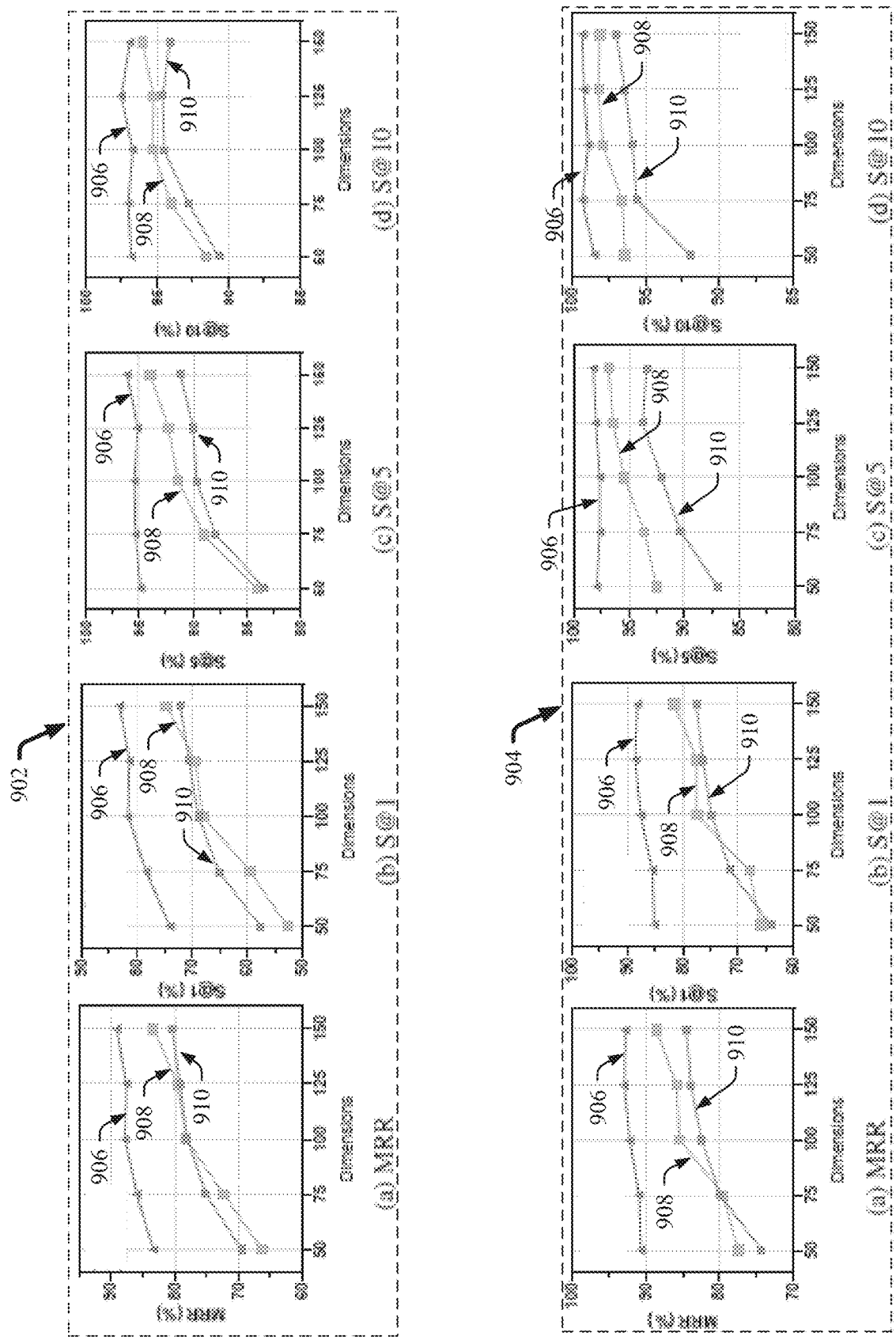
FIG. 9 illustrates a diagram of example, non-limiting graphs that can demonstrate the efficacy of one or more graph neural network based approaches to perform a semantic code retrieval task in accordance with one or more embodiments described herein.

FIG. 9 illustrates a diagram of example, non-limiting graphs that can demonstrate the impact of various feature dimensions that can be employed by the encoding component 402 in accordance with one or more embodiments described herein. Repetitive description of like elements employed in other embodiments described herein is omitted for sake of brevity. Graph row 902 includes a plurality of graphs demonstrating the impact of various feature dimension variants with regards the JAVA® dataset and evaluated based on the evaluation metrics: MRR, S@1, S@5, and S@10. Graph row 904 includes a plurality of graphs demonstrating the impact of various feature dimension variants with regards the PYTHON® dataset and evaluated based on the evaluation metrics: MRR, S@1, S@5, and S@10. Lines 906 can represent the effects of the feature dimension value on the DGMS-Sub embodiment, lines 908 can represent the effects of the feature dimension value on the DGMS-Mul embodiment, and lines 910 can represent the effects of the feature dimension value on the DGMS-SubMul embodiment.

The graphs of FIG. 9 demonstrate the effect of varying the output dimension of the code retrieval model's 700 RGCN encoder. As shown in FIG. 9, the performance each embodiment of the code retrieval model 700 can improve as the feature dimension employed by the encoding component 402 grows.

FIG. 10 illustrates a diagram of example, non-limiting table 1000 that can demonstrate the effects of various aggregation operations that can be executed by the code searching component 602 in accordance with one or more embodiments described herein. Repetitive description of like elements employed in other embodiments described herein is omitted for sake of brevity. As shown in table 1000, the code retrieval model 700 can achieve superior performance evaluations where the code searching component 602 executes FCAvg and/or FCMax aggregation operations. The results of table 1000 can demonstrate the effect that the fully connected layer transformation after the max/average pooling can have in aggregating the graph-level embeddings.

Figure 11:
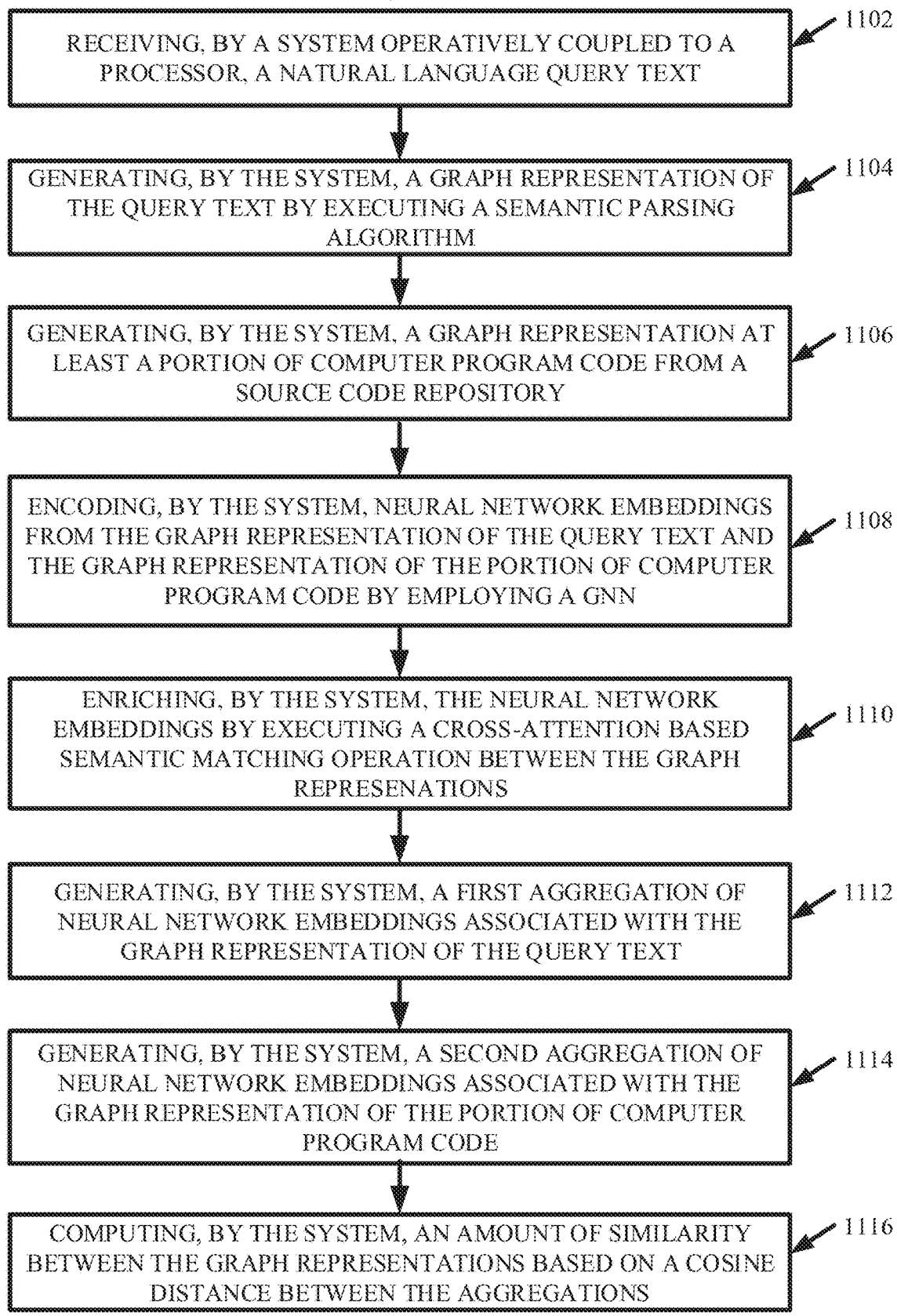
FIG. 11 illustrates a flow diagram of an example, non-limiting computer-implemented method that can facilitate an end-to-end semantic code retrieval task based on graph neural networks in accordance with one or more embodiments described herein.

FIG. 11 illustrates a flow diagram of an example, non-limiting computer-implemented method 1100 that can facilitate one or more code retrieval tasks in accordance with one or more embodiments described herein. Repetitive description of like elements employed in other embodiments described herein is omitted for sake of brevity. For example, computer-implemented method 1100 can be implement by the code retrieval component 110, as characterized by the code retrieval model 700, in accordance with various embodiments described herein. In various embodiments, the computer-implemented method 1100 can facilitate execution of a code retrieval machine learning task by computing an amount of similarity between neural network embeddings of graph representations of a query text and a portion of a computer program code.

At 1102, the computer-implemented method 1100 can comprise receiving (e.g., via communications component 112), by a system 100 operatively coupled to a processor 120, a natural language query text. For example, the natural language query text can be entered into the system 100 via one or more input devices 106. In various embodiments, the query text can describe one or more characteristics of a computer program source code targeted for retrieval by a code retrieval machine learning task.

At 1104, the computer-implemented method 1100 can comprise generating (e.g., via graph construction component 114), by the system 100, a graph representation of the query text by executing one or more semantic parsing algorithms. For example, at 1104 constituency parsing can be employed to generate one or more text graphs having a constituency tree structure (e.g., as exemplified by text graph 300). In one or more embodiments, the graph representation of the query text (e.g., the text graph) generated at 1104 can also incorporate word ordering information of sentences by linking words (e.g., end terminals) of sentences in a chain (e.g., via bidirectional edges).

At 1106, the computer-implemented method 1100 can comprise generating (e.g., via graph construction component 114), by the system 100, a graph representation of at least a portion of computer program code (e.g., a code snippet) from one or more source code repositories 108. For example, the graph representation of the code (e.g., the code graph) can have a program graph structure, which can utilize various edge types to model the syntactic and semantic relationship between nodes and/or tokens (e.g., as exemplified by code graph 200). In one or more embodiments, the program graph structure employed at 1106 can be analogous to the constituency tree structure employed at 1104; thereby enabling the system 100 (e.g., via code retrieval component 110) to represent both the query text and the computer program code (e.g., source code and/or snippet of source code) from a unified graph perspective.

At 1108, the computer-implemented method 1100 can comprise encoding (e.g., via encoder component 02), by the system 100, neural network embeddings from the graph representations by employing one or more GNNs. In various embodiments, the GNNs can be one or more neural networks capable of learning node embeddings of a graph with different edge types. In one or more embodiments, the encoding at 1108 can employ one or more graph embedding methods, such as GNNs, that consider graph structure and/or node attributes as inputs. Example GNNs that can be employed at 1108 can include, but are not limited to: RGCNs, MPNNs, CGCNs, a combination thereof, and/or the like.

At 1110, the computer-implemented method 1100 can comprise enriching (e.g., via semantic matching component 502), by the system 100, the neural network embeddings encoded at 1108 by executing one or more cross-attention based semantic matching operations between the graph representations generated at 1104 and/or 1106. For example, the cross-attention based semantic matching operations can compute cosine attention similarity between pairs of nodes in one graph and all nodes in another graph (e.g., as characterized by Equations 3-4 described herein). Further, the enriching at 1110 can measure the relatedness between each pair of node embeddings in the two graphs (e.g., as characterized by Equations 5-7 described herein).

At 1112, the computer-implemented method 1100 can comprise generating (e.g., via code searching component 602), by the system, a first aggregation of neural network embeddings associated with the graph representation of the query text (e.g., the text graph generated at 1104). At 1114, the computer-implemented method 1100 can comprise generating (e.g., via code searching component 602), by the system, a second aggregation of neural network embeddings associated with the graph representation of the portion of computer program code (e.g., the code graph generated at

1106). For example, one or more aggregation operations, such as FCAvg and/or FCMax, can be executed at 1112 and/or 1114 to generate the aggregations. At 1116, the computer-implemented method 1100 can comprise computing (e.g., via code searching component 602), by the system 100, an amount of similarity between the graph representations based on a distance measure (e.g., cosine distance) between the aggregations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
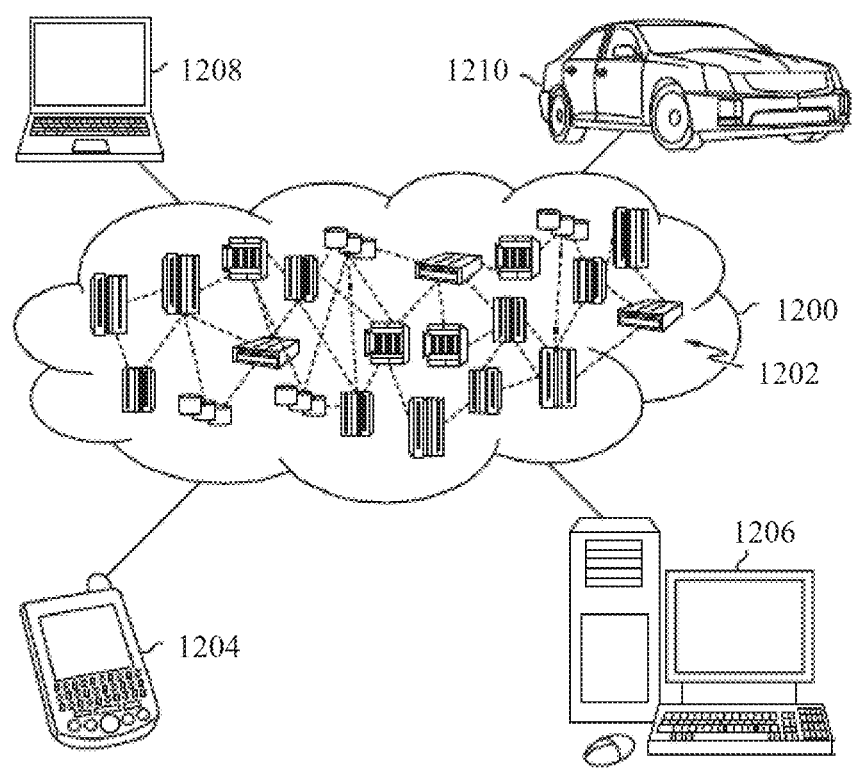
FIG. 12 depicts a cloud computing environment in accordance with one or more embodiments described herein.

Referring now to FIG. 12, illustrative cloud computing environment 1200 is depicted. As shown, cloud computing environment 1200 includes one or more cloud computing nodes 1202 with which local computing devices used by cloud consumers, such as, for example, personal digital assistant (PDA) or cellular telephone 1204, desktop computer 1206, laptop computer 1208, and/or automobile computer system 1210 may communicate. Nodes 1202 may communicate with one another. They may be grouped (not shown) physically or virtually, in one or more networks, such as Private, Community, Public, or Hybrid clouds as described hereinabove, or a combination thereof. This allows cloud computing environment 1200 to offer infrastructure, platforms and/or software as services for which a cloud consumer does not need to maintain resources on a local computing device. It is understood that the types of computing devices 1204-1210 shown in FIG. 12 are intended to be illustrative only and that computing nodes 1202 and cloud computing environment 1200 can communicate with any type of computerized device over any type of network and/or network addressable connection (e.g., using a web browser).

Figure 13:
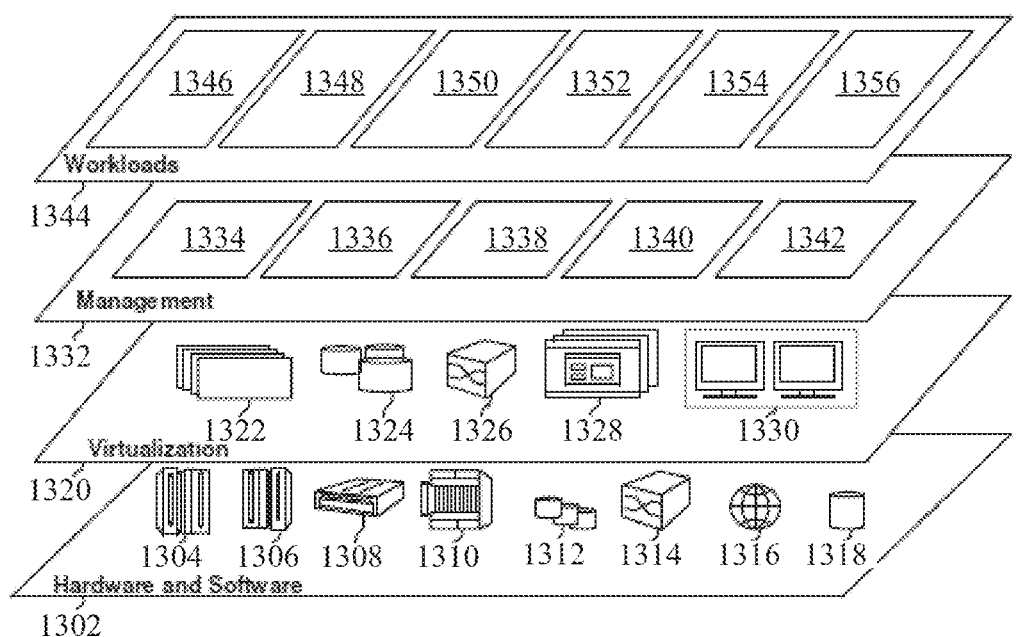
FIG. 13 depicts abstraction model layers in accordance with one or more embodiments described herein

Referring now to FIG. 13, a set of functional abstraction layers provided by cloud computing environment 1200 (FIG. 12) is shown. Repetitive description of like elements employed in other embodiments described herein is omitted for sake of brevity. It should be understood in advance that the components, layers, and functions shown in FIG. 13 are intended to be illustrative only and embodiments of the invention are not limited thereto. As depicted, the following layers and corresponding functions are provided.

Hardware and software layer 1302 includes hardware and software components. Examples of hardware components include: mainframes 1304; RISC (Reduced Instruction Set Computer) architecture based servers 1306; servers 1308; blade servers 1310; storage devices 1312; and networks and networking components 1314. In some embodiments, software components include network application server software 1316 and database software 1318.

Virtualization layer 1320 provides an abstraction layer from which the following examples of virtual entities may be provided: virtual servers 1322; virtual storage 1324; virtual networks 1326, including virtual private networks; virtual applications and operating systems 1328; and virtual clients 1330.

In one example, management layer 1332 may provide the functions described below. Resource provisioning 1334 provides dynamic procurement of computing resources and other resources that are utilized to perform tasks within the cloud computing environment. Metering and Pricing 1336 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1338 provides access to the cloud computing environment for consumers and system administrators. Service level management 1340 provides cloud computing resource allocation and management such that required service levels are met. Service Level Agreement (SLA) planning and fulfillment 1342 provide pre-arrangement for, and procurement of, cloud computing resources for which a future requirement is anticipated in accordance with an SLA.

Workloads layer 1344 provides examples of functionality for which the cloud computing environment may be utilized. Examples of workloads and functions which may be provided from this layer include: mapping and navigation 1346; software development and lifecycle management 1348; virtual classroom education delivery 1350; data analytics processing 1352; transaction processing 1354; and computer program code retrieval 1356. Various embodiments of the present invention can utilize the cloud computing environment described with reference to FIGS. 12 and 13 to receive natural language queries, access and/or retrieve data from source code repositories 108, and/or identify computer program codes (e.g., source code snippets) that best match the queries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 14:
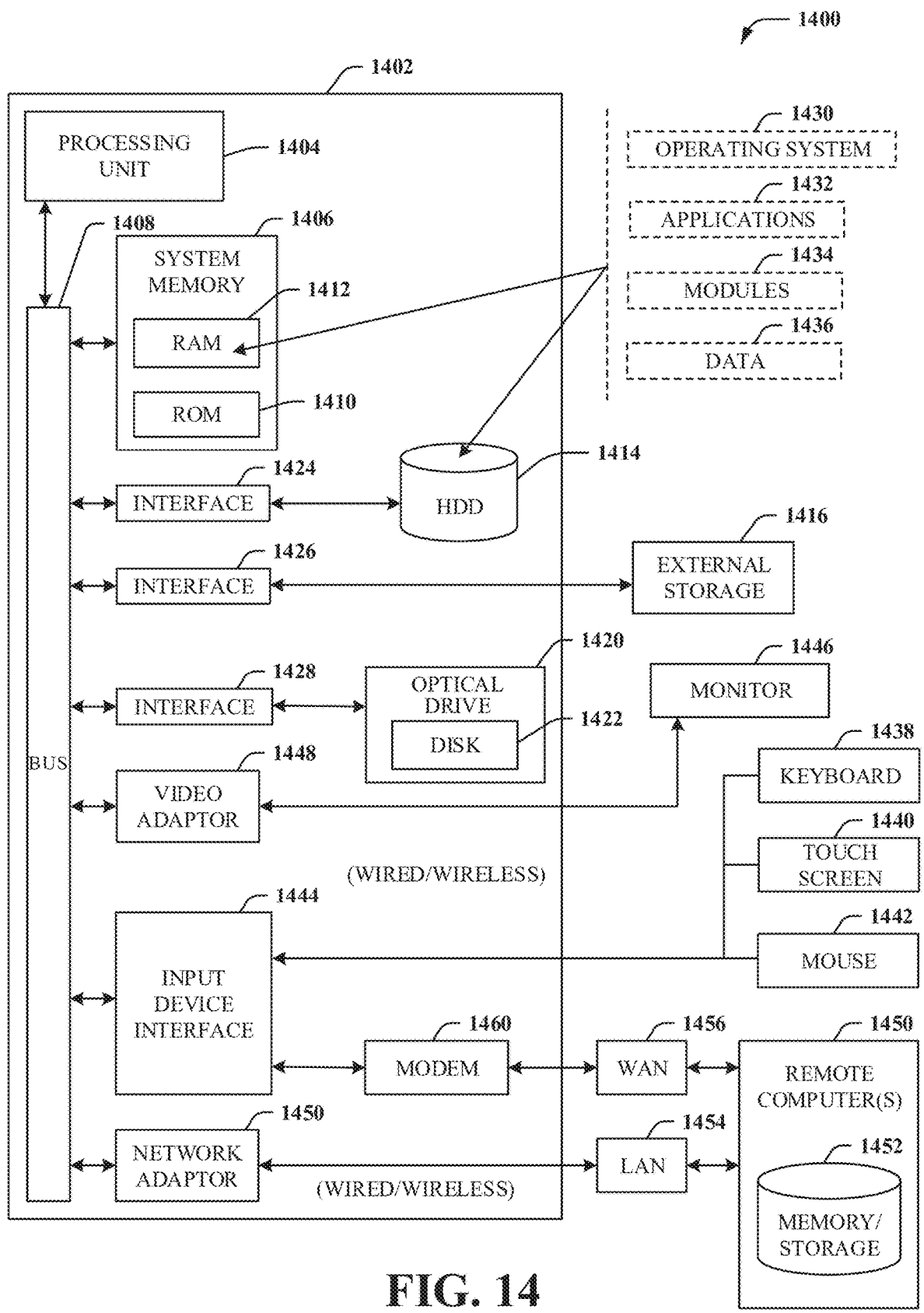
FIG. 14 illustrates a block diagram of an example, non-limiting operating environment in which one or more embodiments described herein can be facilitated.

In order to provide additional context for various embodiments described herein, FIG. 14 and the following discussion are intended to provide a general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system ("BIOS") can be stored in a non-volatile memory such as ROM, erasable programmable read only memory ("EPROM"), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive ("HDD") 1414 (e.g., EIDE, SATA), one or more external storage devices 1416 (e.g., a magnetic floppy disk drive ("FDD") 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive ("SSD") could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine ("VM") of multiple VMs hosted at computer 1402. Furthermore, operating system 1430 can provide runtime environments, such as the JAVA® runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1402, e.g., applied at the application execution level or at the operating system ("OS") kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network ("LAN") 1454 and/or larger networks, e.g., a wide area network ("WAN") 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point ("AP") disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor, operably coupled to the memory, and that executes the computer executable components stored in the memory, wherein the computer executable components comprise:
   an encoding component that analyses a text graph comprising a first set of neural network embeddings and that analyzes a code graph representing a second set of neural network embeddings, wherein the code graph comprises at least NextToken edges that connect individual syntax tokens in the code graph to respective successor tokens in a portion of computer program code; and
   a semantic matching component that computes an amount of similarity between a first neural network embedding of the first set of neural network embeddings and all neural network embeddings of the second set of neural network embeddings, to facilitate a code retrieval machine learning task, wherein the semantic matching component executes a cross-attention based semantic matching operation to compute respective amounts of similarity between the first neural network embedding of the first set of neural network embeddings and the all neural network embeddings of the second set of neural network embeddings, and to update the first set of neural network embeddings with first structure information about the respective amounts of similarity, and to update the second set of neural network embeddings with second structure information about the respective amounts of similarity.

2. The system of claim 1, further comprising:
   a graph construction component that generates the text graph by executing a semantic parsing algorithm, wherein the text graph represents a query text and the code graph represents the portion of computer program code.

3. The system of claim 1, wherein the text graph has a constituency tree structure, and wherein the code graph has a program graph structure.

4. The system of claim 1, wherein
   the encoding component employs a graph neural network to encode the text graph to obtain the first set of neural network embeddings and to encode the code graph to obtain the second set of neural network embeddings.

5. The system of claim 1, wherein the semantic matching component executes the cross-attention based semantic matching operation via computation of a cosine attention similarity between pairs of neural network embeddings.

6. The system of claim 1, wherein the computer executable components further comprise:
   a code searching component that generates a first aggregation of the first set of neural network embeddings and a second aggregation of the second set of neural network embeddings.

7. The system of claim 6, wherein the code searching component computes the amount of similarity between the first set of neural network embeddings and the second set of neural network embeddings, based further on a distance measure between the first aggregation and the second aggregation.

8. A computer-implemented method, comprising:
analyzing, by a system operatively coupled to a processor, a text graph comprising a first set of neural network embeddings;
analyzing, by the system, a code graph comprising a second set of neural network embeddings, wherein the code graph comprises at least NextToken edges that connect individual syntax tokens in the code graph to respective successor tokens in a portion of computer program code; and
computing, by the system, an amount of similarity between a first neural network embedding of the first set of neural network embeddings and all neural network embeddings of the second set of neural network embeddings, to facilitate a code retrieval machine learning task, wherein the computing comprises executing a cross-attention based semantic matching operation to compute respective amounts of similarity between the first neural network embedding of the first set of neural network embeddings and the all neural network embeddings of the second set of neural network embeddings, and to update the first set of neural network embeddings with first structure information about the respective amounts of similarity, and to update the second set of neural network embeddings with second structure information about the respective amounts of similarity.

9. The computer-implemented method of claim 8, further comprising:
generating, by the system, the text graph by executing a semantic parsing algorithm, wherein the text graph represents a query text and wherein the code graph represents the portion of computer program code.

10. The computer-implemented method of claim 8, further comprising:
encoding, by the system, the text graph to obtain the first set of neural network embeddings, using a graph neural network; and
encoding, by the system, the code graph to obtain the second set of neural network embeddings, using the graph neural network.

11. The computer-implemented method of claim 8, further comprising:
executing, by the system, the cross-attention based semantic matching operation via computation of a cosine attention similarity between pairs of neural network embeddings.

12. The computer-implemented method of claim 8, further comprising:
generating, by the system, a first aggregation of the first set of neural network embeddings and a second aggregation of the second set of neural network embeddings.

13. The computer-implemented method of claim 12, further comprising:
computing, by the system, the amount of similarity between the first set of neural network embeddings and the second set of neural network embeddings, based further on a distance measure between the first aggregation and the second aggregation.

14. The computer-implemented method of claim 8, wherein the text graph has a constituency tree structure, and wherein the code graph has a program graph structure.

15. A computer program product for matching a portion of computer program code to a query text, the computer program product comprising a non-transitory computer readable medium having program instructions embodied therewith, the program instructions executable by a processor to cause the processor to:
analyze, by the processor, a text graph comprising a first set of neural network embeddings;
analyze, by the processor, a code graph comprising a second set of neural network embeddings, wherein the code graph comprises at least NextToken edges that connect individual syntax tokens in the code graph to respective successor tokens in the portion of computer program code; and
compute, by the processor, an amount of similarity between a first neural network embedding of the first set of neural network embeddings and all neural network embeddings of the second set of neural network embeddings, to facilitate a code retrieval machine learning task, wherein the computation of the amount of similarity comprises execute a cross-attention based semantic matching operation to compute respective amounts of similarity between the first neural network embedding of the first set of neural network embeddings and the all neural network embeddings of the second set of neural network embeddings, and to update the first set of neural network embeddings with first structure information about the respective amounts of similarity, and to update the second set of neural network embeddings with second structure information about the respective amounts of similarity.

16. The computer program product of claim 15, wherein the program instructions further cause the processor to:
generate, by the processor, the text graph by executing a semantic parsing algorithm, wherein the text graph represents the query text and the code graph represents the portion of computer program code.

17. The computer program product of claim 15, wherein the program instructions further cause the processor to:
encode, by the processor, the text graph to obtain the first set of neural network embeddings, using a graph neural network; and
encode, by the processor, the code graph to generate the second set of neural network embeddings, using the graph neural network.

18. The computer program product of claim 15, wherein the program instructions further cause the processor to:
execute, by the processor, the cross-attention based semantic matching operation via computation of a cosine attention similarity between pairs of neural network embeddings.

19. The computer program product of claim 15, wherein the program instructions further cause the processor to:
generate, by the processor, a first aggregation of the first set of neural network embeddings and a second aggregation of the second set of neural network embeddings; and
compute, by the processor, the amount of similarity between the first set of neural network embeddings and the second set of neural network embeddings, based further on a distance measure between the first aggregation and the second aggregation.

20. The computer program product of claim 19, wherein the text graph has a constituency tree structure, and wherein the code graph has a program graph structure.

* * * * *